US011954442B2

(12) United States Patent
Liang et al.

(10) Patent No.: US 11,954,442 B2
(45) Date of Patent: Apr. 9, 2024

(54) NEURAL SYMBOLIC READER

(71) Applicant: Google LLC, Mountain View, CA (US)

(72) Inventors: Chen Liang, Los Altos, CA (US); Wei Yu, Palo Alto, CA (US); Quoc V. Le, Sunnyvale, CA (US); Xinyun Chen, Berkeley, CA (US); Dengyong Zhou, Redmond, WA (US)

(73) Assignee: GOOGLE LLC, Mountain View, CA (US)

( * ) Notice: Subject to any disclaimer, the term of this patent is extended or adjusted under 35 U.S.C. 154(b) by 367 days.

(21) Appl. No.: 16/986,534

(22) Filed: Aug. 6, 2020

(65) Prior Publication Data
US 2022/0043981 A1    Feb. 10, 2022

(51) Int. Cl.
*G06F 40/30* (2020.01)
*G06F 16/33* (2019.01)
*G06F 40/20* (2020.01)
*G06N 3/045* (2023.01)
*G06N 3/08* (2023.01)
*G06N 20/00* (2019.01)
*G06F 40/216* (2020.01)
*G06F 40/284* (2020.01)

(52) U.S. Cl.
CPC .......... *G06F 40/30* (2020.01); *G06F 16/3347* (2019.01); *G06F 40/20* (2020.01); *G06N 3/045* (2023.01); *G06N 3/08* (2013.01); *G06N 20/00* (2019.01); *G06F 40/216* (2020.01); *G06F 40/284* (2020.01)

(58) Field of Classification Search
CPC ..... G06F 40/30; G06F 40/216; G06N 3/0454; G06N 3/08
See application file for complete search history.

(56) References Cited

PUBLICATIONS

Gupta, Nitish, Kevin Lin, Dan Roth, Sameer Singh, and Matt Gardner, "Neural Module Networks for Reasoning over Text", Feb. 2020, ArXiv abs/1912.04971, pp. 1-17. (Year: 2020).*
Amini, Aida, Saadia Gabriel, Shanchuan Lin, Rik Koncel-Kedziorski, Yejin Choi, and Hannaneh Hajishirzi, "MathQA: Towards Interpretable Math Word Problem Solving with Operation-Based Formalisms", Proceedings of NAACL-HLT 2019, pp. 2357-2367. (Year: 2019).*

(Continued)

*Primary Examiner* — Richa Sonifrank
*Assistant Examiner* — James Boggs
(74) *Attorney, Agent, or Firm* — DORITY & MANNING P.A.

(57) ABSTRACT

The present disclosure is directed to systems and methods for performing reading comprehension with machine learning. More specifically, the present disclosure is directed to a Neural Symbolic Reader (example implementations of which may be referred to as NeRd), which includes a reader to encode the passage and question, and a programmer to generate a program for multi-step reasoning. By using operators like span selection, the program can be executed over a natural language text passage to generate an answer to a natural language text question. NeRd is domain-agnostic such that the same neural architecture works for different domains. Further, NeRd is compositional such that complex programs can be generated by compositionally applying the symbolic operators.

20 Claims, 8 Drawing Sheets

(56) References Cited

PUBLICATIONS

Bunel, Rudy, Matthew J. Hausknecht, Jacob Devlin, Rishabh Singh, and Pushmeet Kohli, "Leveraging Grammar and Reinforcement Learning for Neural Program Synthesis", 2018, ArXiv abs/1805.04276, pp. 1-15. (Year: 2018).*
Yang, Fan, Jiazhong Nie, William W. Cohen, and N. Lao, "Learning to Organize Knowledge and Answer Questions with N-Gram Machines", 2018, 32nd Conference on Neural Information Processing Systems (NIPS 2018), pp. 1-16. (Year: 2018).*
Dua, Dheeru, Yizhong Wang, Pradeep Dasigi, Gabriel Stanovsky, Sameer Singh, and Matt Gardner, "DROP: A Reading Comprehension Benchmark Requiring Discrete Reasoning Over Paragraphs", Proceedings of NAACL-HLT 2019, pp. 2368-2378. (Year: 2019).*
Zhong, Victor, Caiming Xiong, and Richard Socher, "Seq2SQL: Generating Structured Queries from Natural Language using Reinforcement Learning", 2017, ArXiv abs/1709.00103, pp. 1-12. (Year: 2017).*
Min, Sewon, Danqi Chen, Hannaneh Hajishirzi, and Luke Zettlemoyer "A Discrete Hard EM Approach for Weakly Supervised Question Answering", 2019, Proceedings of the 2019 Conference on Empirical Methods in Natural Language Processing (EMNLP 2019), pp. 2851-2864. (Year: 2019).*
Yang, Qing, Yudi Gu, and Dongsheng Wu, "Survey of Incremental Learning", 2019, 2019 Chinese Control and Decision Conference (CCDC), pp. 399-404. (Year: 2019).*
Liang, Chen, Mohammad Norouzi, Jonathan Berant, Quoc V. Le, and N. Lao, "Memory Augmented Policy Optimization for Program Synthesis and Semantic Parsing", 2018, 32nd Conference on Neural Information Processing Systems (NeurIPS 2018), pp. 1-13. (Year: 2018).*
Chen, Xinyun, Chen Liang, Adams Wei Yu, Denny Zhou, Dawn Xiaodong Song, and Quoc V. Le, "Neural Symbolic Reader: Scalable Integration of Distributed and Symbolic Representations for Reading Comprehension", Apr. 2020, 8th International Conference on Learning Representations (ICLR 2020), pp. 1-16. (Year: 2020).*
Tang, Xiangru, and Xinhui Tu, "SYMGraph: A Neural Symbolic Approach with Numerically-Aware Graph for Discrete Reasoning", Feb. 2020, AAAI 2020 Reasoning for Complex Question Answering (RCQA) Workshop. (Year: 2020).*
Amini, "MathQA: Towards Interpretable Math Word Problem Solving with Operation-Based Formalisms", arXiv preprint arXiv:1905.13319, May 30, 2019, 11 pages.
Andor, "Giving BERT a Calculator: Finding Operations and Arguments with Reading Comprehension", arXiv:1909.00109, Sep. 12, 2019, 10 pages.
Andreas, "Learning to Compose Neural Networks for Question Answering", arXiv:1601.01705, Jun. 7, 2016, 10 pages.
Bahdanau et al., "Neural Machine Translation by Jointly Learning to Align and Translate", arXiv:1409.0473, Dec. 19, 2014, 15 pages.
Berant et al., "Semantic Parsing on Freebase from Question-Answer Pairs", Conference on Empirical Methods in Natural Language Processing, Seattle, Washington, Oct. 18-21, 2013, pp. 1533-1544.
Bunel et al., "Leveraging Grammar and Reinforcement Learning for Neural Program Synthesis", International Conference on Learning Representations, arXiv:1805.0427v2, May 22, 2018, 15 pages.
Cai et al., "Making Neural Programming Architectures Generalize via Recursion", $5^{th}$ International Conference on Learning Representations, Toulon, France, Apr. 24-26, 2017, 20 pages.
Carreras et al., "Introduction to the CoNLL-2004 Shared Task: Semantic Role Labeling", Proceedings of the Eighth Conference on Computational Natural Language Learning at Human Language Technology—North American Association for Computational Linguistics, Boston, Massachusetts, May 6-7, 2004, pp. 89-97.
Chen et al., "Reading Wikipedia to Answer Open-Domain Questions", Proceedings of the $55^{th}$ Annual Meeting of the Association for Computational Linguistics, Association for Computational Linguistics, vol. 1: Long Papers, Vancouver, Canada, Jul. 30-Aug. 4, pp. 1870-1879.

Dasigi et al., "Iterative Search for Weakly Supervised Semantic Parsing", Proceedings of the 2019 Conference of the North American Chapter of the Association for Computational Linguistics: Human Language Technologies, vol. 1 (Long and Short Papers), Minneapolis, Minnesota, Jun. 2-7, 2019, pp. 2669-2680.
Devlin et al., "Bert: Pre-Training of Deep Bidirectional Transformers for Language Understanding", Conference of the North American Chapter of the Association for Computational Linguistics: Human Language Technologies, vol. 1 (Long and Short Papers), Minneapolis, Minnesota, Jun. 2-7, 2019, pp. 4171-4186.
Dong et al., "Language to Logical Form with Neural Attention", $54^{th}$ Annual Meeting of the Association for Computational Linguistics, vol. 1: Long Papers, Berlin, Germany, Aug. 7-12, 2016, 11 pages.
Dong et al., "Neural Logic Machines", 7th International Conference on Learning Representations, New Orleans, Louisiana, May 6-9, 2019, 22 pages.
Dua et al., "DROP: A Reading Comprehension Benchmark Requiring Discrete Reasoning Over Paragraphs", Proceedings of North American Association for Computational Linguistics, Minneapolis, Minnesota, Jun. 2-7, 2019, pp. 2368-2378.
Graves et al., "Neural Turing Machines", arXiv:1410.5401v2, Dec. 10, 2014. 26 pages.
Guu et al., "From Language to Programs: Bridging Reinforcement Learning and Maximum Marginal Likelihood", arXiv:1704.07926v1, Apr. 25, 2017, 12 pages.
Hochreiter et al., "Long Short-Term Memory", Neural Computation, vol. 9, No. 8, Dec. 1997, pp. 1735-1780.
Hu et al., A Multi-Type Multi-Span Network for Reading Comprehension that Requires Discrete Reasoning. arXiv:1908.05514v2, Aug. 30, 2019, 12 pages.
Jia et al., "Data Recombination for Neural Semantic Parsing", $5^{5th}$ Annual Meeting of the Association for Computational Linguistics (vol. 1: Long Papers), Berlin, Germany, Aug. 7-12, 2016, pp. 12-22.
Johnson et al., "Inferring and Executing Programs for Visual Reasoning", International Conference on Computer Vision, Venice, Italy, Oct. 22-29, 2017, pp. 2989-2998.
Kaiser et al., "Neural GPUs Learn Algorithms", arXiv:1511.08228v1, Nov. 25, 2015, 9 pages.
Klein et al., OpenNMT: Neural Machine Translation Toolkit. arXiv:1805.11462v1, May 28, 2018, 8 pages.
Krishnamurthy et al., "Neural Semantic Parsing with Type Constraints for Semi-Structured Tables", Conference on Empirical Methods in Natural Language Processing, Copenhagen, Denmark, Sep. 2017, pp. 1516-1526.
Liang et al, "Neural Symbolic Machines: Learning Semantic Parsers on Freebase with Weak Supervision". $55^{th}$ Annual Meeting of the Association for Computational Linguistics (vol. 1: Long Papers), Vancouver, Canada, Jul. 30-Aug. 4, 2017, pp. 23-33.
Liang et al., "Memory Augmented Policy Optimization for Program Synthesis and Semantic Parsing", $32^{nd}$ Conference on Neural Information Processing Systems, Montreal, Canada, Dec. 2-8, 2018, pp. 10015-10027.
Ling et al., Program Induction by Rationale Generation: Learning to Solve and Explain Algebraic Word Problems, 55th Annual Meeting of the Association for Computational Linguistics (vol. 1: Long Papers), Vancouver, Canada, Jul. 30-Aug. 4, 2017, pp. 158-167.
Liu et al., "Roberta: A Robustly Optimized BERT Pretraining Approach", arXiv: 1907.11692v1, Jul. 26, 2019, 13 pages.
Manning et al., "The Stanford CoreNLP Natural Language Processing Toolkit", Proceedings of 52nd Annual Meeting of the Association for Computational Linguistics: System Demonstrations, Baltimore, Maryland, Jun. 23-24, 2014, pp. 55-60.
Mao et al., "The Neurosymbolic Concept Learner: Interpreting Scenes, Words, and Sentences from Natural Supervision", 7th International Conference on Learning Representations, New Orleans, Louisiana, May 6-9, 2019, 28 pages.
Min et al., "A Discrete Hard EM Approach for Weakly Supervised Question Answering". arXiv:1909.04849v1, Sep. 11, 2019, 14 pages.
Neelakantan et al., "Learning a Natural Language Interface with Neural Programmer", arXiv:1611.08945v1, Nov. 28, 2016, 10 pages.

(56) References Cited

PUBLICATIONS

Pasupat et al., "Compositional Semantic Parsing on Semi-Structured Tables", $53^{rd}$ Annual Meeting of the Association for Computation Linguistics (vol. 1: Long Papers), Beijing, China, Jul. 26-31, 2015, pp. 1470-1480.
Peters et al., "Deep Contextualized Word Representations", 2018 Conference of the North American Chapter of the Association for Computational Linguistics: Human Language Technologies, vol. 1 (Long Papers), New Orleans, Louisiana, Jun. 1-6, 2018, pp. 2227-2237.
Rajpurkar et al., SQuAD: 100,000+ Questions for Machine Comprehension of Text. 2016 Conference on Empirical Methods in Natural Language Processing, Austin, Texas, Nov. 1-4, 2016, pp. 2383-2392.
Reddy et al., "CoQA: A Conversational Question Answering Challenge", Transactions of the Association for Computational Linguistics, vol. 7, Mar. 2019, pp. 249-266.
Reed et al., "Neural Programmer-Interpreters", arXiv:1511.06279v4, Feb. 29, 2016, 13 pages.
Rosenfeld et al., "Edge and Curve Detection for Visual Scene Analysis", IEEE Transactions on Computers, vol. C-20, Issue 6, May 1971, pp. 562-569.
Seo et al., "Bidirectional Attention Flow for Machine Comprehension", arXiv:1611.01603v6, Jun. 21, 2018, 13 pages.
Vaswani et al., "Attention is All You Need", $31^{st}$ Conference on Advances in Neural Information Processing Systems, Long Beach, California, Dec. 4-9, 2017, pp. 5998-6008.
Vinyals et al., "Pointer Networks", $28^{th}$ Conference on Advances in Neural Information Processing Systems, Montreal, Canada, Dec. 7-12, 2015, 9 pages.
Wang et al., "Gated Self-Matching Networks for Reading Comprehension and Question Answering", 55th Annual Meeting of the Association for Computational Linguistics (vol. 1: Long Papers), Vancouver, Canada, Jul. 30-Aug. 4, 2017, pp. 189-198.
Wang et al., "GLUE: A Multi-Task Benchmark and Analysis Platform for Natural Language Understanding", $7^{th}$ International Conference on Learning Representations, New Orleans, Louisiana, May 6-9, 2019, 20 pages.
Xiong et al., "Dynamic Coattention Networks for Question Answering", arXiv:1611.01604v2, Nov. 17, 2016, 13 pages.
Yang et al., "XLNet: Generalized Autoregressive Pretraining for Language Understanding", arXiv:1906.08237v1, Jun. 19, 2019, 18 pages.
Yu et al., "QANet: Combining Local Convolution with Global Self-Attention for Reading Comprehension", 6th International Conference on Learning Representations, Vancouver, Canada, Apr. 30-May 3, 2018, 16 pages.
Zhong et al., "Seq2SQL: Generating Structured Queries from Natural Language using Reinforcement Learning", arXiv:1709.00103v7, Nov. 9, 2017, 12 pages.

\* cited by examiner

NEURAL SYMBOLIC READER

FIELD

The present disclosure relates generally to natural language processing. More particularly, the present disclosure relates to computer-implemented systems and methods which can process natural language text passages and questions to generate a program for multi-step reasoning that can be executed to produce an answer. Aspects of the present disclosure can further include processing the natural language text passage to generate embeddings and using the embeddings and an associated set of operators for a domain specific language to generate a program that can be executed in different domains.

BACKGROUND

Deep neural networks have achieved remarkable successes in natural language processing, including text pattern matching. Pretrained language models (e.g., BERT) have significantly advanced state-of-the-art in reading comprehension. Specifically, these neural models have demonstrated performance superior to humans on some benchmarks (e.g., SQuAD) when limited to extractive question answering, in which the answer is a single span from the text.

Some recent datasets (e.g., DROP and MathQA) examine the capability of both language understanding and discrete reasoning, where the direct application of the state-of-the-art pre-trained language models, such as BERT or QANet, achieves very low accuracy. This is especially challenging for pure neural network approaches because discrete operators learned by neural networks, such as addition and sorting, can hardly generalize to inputs of arbitrary size without specialized design. Therefore, integrating neural networks with symbolic reasoning is crucial for solving those new tasks.

Recent progress on neural semantic parsing has sought to address this problem. However, such success is mainly restricted to question answering with structured data sources, e.g., knowledge graphs or tabular databases. Extending it to reading comprehension for unstructured sources, for example by parsing the text into structured representations, suffers severely from the cascade errors, i.e., the issues of the structured parsing for data preprocessing account for the poor performance of the learned neural model.

A recent line of work extends BERT/QANet to perform reasoning on the DROP dataset. However, these works cannot easily scale to multiple domains or multi-step complex reasoning because they usually rely on handcrafted and specialized modules for each type of questions. Furthermore, these works do not support compositional applications of the operators, so it is hard to perform reasoning of more than one step.

As far as training computer-implemented systems and methods for reading comprehension, previous works mainly take two approaches to training: either augmenting a pre-trained language model such as BERT with specialized modules for each type of questions or applying a neural semantic parser to the structured parses of the passage. Augmenting a pre-trained language model is difficult to scale to multiple domains. The neural semantic parser approach suffers severely from the cascade error. Still needed are approaches which overcome the challenge of training reading comprehension models with weak supervision.

Thus, current approaches for computer-implemented natural language processing for reading comprehension mostly rely on specialized neural modules which are hard to adapt to multiple domains or multi-step reasoning. Still needed are approaches which integrate distributed representations with symbolic operations, which is essential for reading comprehension requiring complex reasoning, such as counting, sorting and arithmetics.

SUMMARY

Aspects and advantages of embodiments of the present disclosure will be set forth in part in the following description, or can be learned from the description, or can be learned through practice of the embodiments.

One example aspect of the present disclosure is directed to a computing system configured to perform reading comprehension with machine learning. The computing system includes one or more processors and one or more non-transitory computer-readable media that collectively store: a machine-learned neural symbolic reader model that comprises a machine-learned reader model and a machine-learned programmer model; and instructions that, when executed by the one or more processors, cause the computing system to perform operations. The operations include obtaining, by the computing system, a natural language text passage and a natural language text question. The operations include processing, by the computing system using the machine-learned reader model, the natural language text passage to obtain one or more embeddings. The operations include decoding, by the computing system using the machine-learned programmer model, the one or more embeddings output by the machine-learned reader model to generate a program that comprises a sequence of operators. The operations include executing, by the computing system, the program on the natural language text passage to generate an answer to the natural language text question.

Another example aspect of the present disclosure is directed to a computer-implemented method to train machine learning models to perform reading comprehension. The method includes obtaining, by a computing system comprising one or more computing devices, a training dataset comprising one or more training examples, each of the one or more training examples comprising a training natural language text passage, a training natural language text question, a training answer to the training natural language text question, and a training program that comprises a sequence of operators that, when executed on the training natural language text passage, generates the training answer. The method includes accessing, by the computing system, a machine-learned programmer model configured to generate a program based on language embeddings associated with an input natural language text passage and an input natural language text question, wherein the machine-learned programmer model comprises a plurality of parameters respectively having a plurality of values. The method includes modifying, by the computing system and based on at least one of the one or more training examples, one or more of the values of one or more of the parameters of the machine-learned programmer model to increase a probability that the machine-learned programmer model generates the training program in response to language embeddings generated from the training natural language text passage and the training natural language text question.

Another example aspect of the present disclosure is directed to one or more non-transitory computer-readable media that collectively store: a machine-learned programmer model configured to generate a program based on language embeddings associated with a natural language text passage and a natural language text question; and instructions that when executed by a computing system comprising one or more computing devices cause the computing system to perform operations. The operations include obtaining one or more embeddings generated by a machine-learned reader model based on the natural language text passage. The operations include decoding, using the machine-learned programmer model, the one or more embeddings output by the machine-learned reader model to generate a program that comprises a sequence of operators. The operations include executing, by the computing system, the program on the natural language text passage to generate an answer to the natural language text question.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
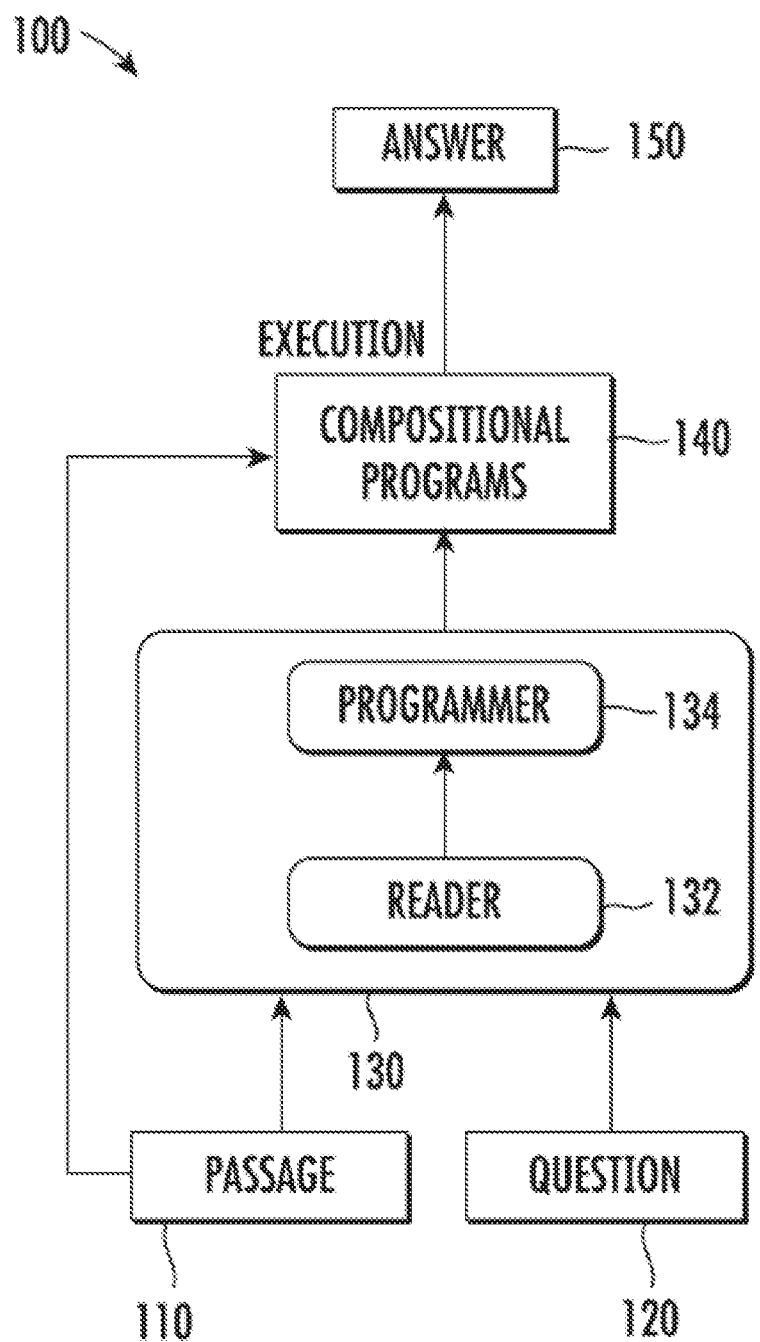
FIG. 1A depicts an example neural symbolic reader that performs reading comprehension according to example embodiments of the present disclosure.

Reference numerals that are repeated across plural figures are intended to identify the same features in various implementations.

DETAILED DESCRIPTION

1. Overview

Generally, the present disclosure provides systems and methods for performing reading comprehension with machine learning that can provide natural language processing for interpreting a natural language text passage. In particular, aspects of the present disclosure are directed to processing natural language text passages and questions to generate a program which can be executed to generate an answer to a natural language text question. Example implementations of the proposed approach enable utilization of a single model across multiple domains.

Example implementations of present disclosure may be referred to as a Neural Symbolic Reader (NeRd), which includes a reader to encode the passage and question (into an embedding such as a vector representation), and a programmer to generate a program for multi-step reasoning. By using operators like span selection, the program can be executed over text to generate the answer. Compared to previous works, NeRd is more scalable in two aspects. First, it is domain-agnostic such that the same neural architecture works for different domains. Secondly, it is compositional such that complex programs can be generated by compositionally applying the symbolic operators. This model results in improved reading comprehension for multi-step reasoning, along with reduced memory storage and faster processing.

According to another aspect, in some implementations, the systems and methods of the present disclosure apply data augmentation techniques and hard Expectation-Maximization (EM) with thresholding to train the model so that it may learn from weak supervision. Weak supervision raises two problems for learning: first, the cold start problem. With no programs available at the beginning of training, training cannot proceed. Some example implementations described herein address the cold start problem through data augmentation that generates noisy training data to bootstrap the training. Second, the spurious program problem, where some programs produce the right answer for wrong rationales. Some example implementations described herein address the spurious program problem by hard EM with thresholding, which filters out the spurious programs during training.

Figure 1B:
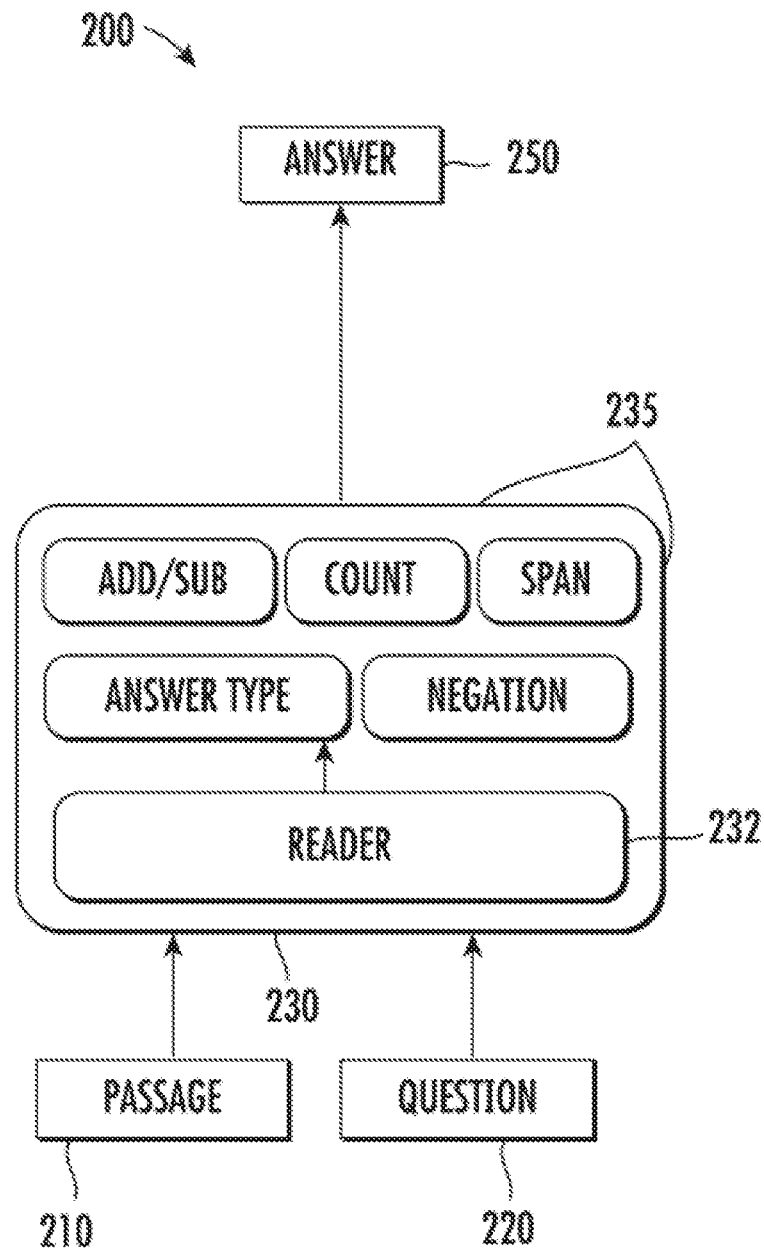
FIG. 1B depicts an example pre-trained language module with specialized modules for each type of question.
Figure 1C:
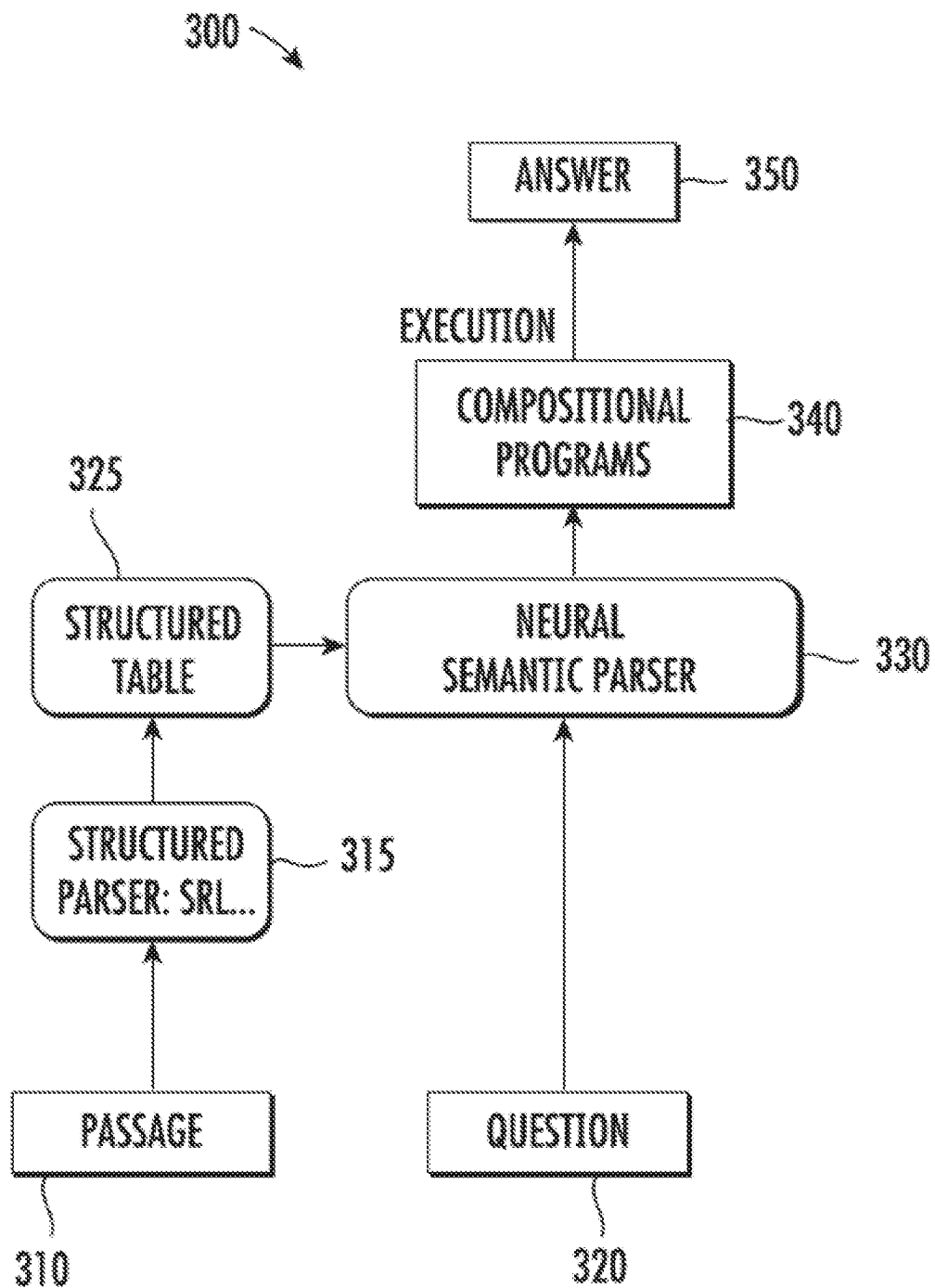
FIG. 1C depicts an example neural symbolic parser.

As one example which will be discussed in further detail elsewhere herein, FIGS. 1A-C compare an example implementation of NeRd (FIG. 1A) with previous approaches for reading comprehension requiring complex reasoning.

Previous works mainly take two approaches: First, as shown in FIG. 1B, some approaches augment pre-trained language model(s) such as BERT with specialized modules for each type of questions, which is hard to scale to multiple domains or multi-step complex reasoning. Second, as shown in FIG. 1C, some approaches apply a neural semantic parser to the structured parses of the passage, which suffers severely from the cascade error.

In contrast, the neural architecture of NeRd (one example is shown in FIG. 1A) is domain-agnostic, which includes a reader 132, e.g., BERT, and a programmer 134, e.g., LSTM, to generate compositional programs 140 that are directly executed over the passages 110. This approach resolves both the domain scalability problems associated with specialized modules and the error-prone nature of application of semantic parsers to structured parses.

The systems and methods of the present disclosure provide a number of technical effects and benefits. As an example technical effect, example implementations of the NeRd architecture demonstrate better accuracy than previous methods. Specifically, on DROP, a challenging reading comprehension dataset requiring discrete reasoning, example implementations of NeRd achieve 1.37%/1.18% absolute gain over the state-of-the-art on Exact-Match/F1 metrics. With the same architecture, example implementations of NeRd significantly outperform the baselines on MathQA, a math problem benchmark that requires multiple steps of reasoning, by 25.5% absolute gain on accuracy when trained on all the annotated programs. Further, example implementations of NeRd still beat the baselines on MathQA even with only 20% of the program annotations.

NeRd is domain-agnostic and compositional, which renders it more scalable than previous methods. Thus, as another example technical effect, unlike previous approaches, which rely on specialized modules that do not support compositional application of the operators, NeRd can be applied to tasks of different domains without changing the architecture. Further, more complex programs can be generated by extending the set of operators and compositionally applying them. Because NeRd can be applied to different domains without changing the architecture, this approach reduces memory usage and allows for faster processing, i.e. training does not have to start from scratch each time. Further, supporting compositional applications of operators improves the ability to perform more complex, multi-step reasoning.

As another example technical effect, NeRd exhibits better interpretability than previous methods. More particularly, it is easier to interpret and verify an answer by inspecting the program that produces it. This is especially applicable for questions involving complex reasoning such as counting and sorting.

The systems and methods of the present disclosure can be used in a number of applications or uses, including, as examples, chat bots, artificial intelligence-based assistants, automated program composition, question answering, and others.

2. Example Neural Symbolic Reader

NeRd includes a reader that encodes the passages and questions into vector representations and a programmer that generates compositional programs in a domain specific language. The design of NeRd will be discussed in further detail below and will be contrasted with two prior approaches.

FIG. 1A depicts an example embodiment of a NeRd model 100. The NeRd model 100 can include a neural architecture 130 comprising a reader 132 and a programmer 134. The neural architecture 130 may be configured to receive a natural language text passage 110 and a natural language text question 120. The neural architecture 130 may produce a compositional program 140. The compositional program 140 may be executed (e.g., against the passage 110) to produce an answer 150 to the question 120.

More particularly, in some implementations, the reader 132 may receive the natural language text passage 110 and question 120. The reader 132 may then encode each token in the text into an embedding. The framework of NeRd 100 is agnostic to the architecture choice of the reader 132. In some implementations, the reader 132 may be a BERT module. In other example embodiments, the reader 132 may be any neural module that turns words into embeddings (e.g., vectors).

The programmer 134 may take an output of the reader 132 as an input. The programmer 134 may then decode a program 140 as a sequence of tokens. In some implementations, the programmer 134 may be a LSTM decoder. In other embodiments, the programmer 134 may be any decoder with attention over the encoded text, and self-attention over the previously generated tokens. A unified programmer 134 may generate a program 140 for multi-step reasoning, so that the operator set may be extended in the domain specific language so that a single programmer 134 may be adapted to different domains.

In some embodiments, the programmer 134 may generate a program token from the reserved tokens of the domain specific language and the input question and passage tokens. A valid program 140 generated by the programmer 134 may satisfy grammar constraints. Therefore, a mask may be generated. In some embodiments, data may be preprocessed to extract the locations and values of numbers in the input question 120 and passage 110. This may be leveraged to generate masks for numerical calculation operations. This example of a grammar-based decoding process may be used to ensure syntactic correctness of the generated program 140.

After the mask generation, the model may predict the next program token. In some embodiments, the model may apply beam search for decoding. However, in many embodiments greedy decoding is sufficient to provide accurate results. Further, the inference process is much faster than a beam search approach.

FIG. 1B depicts a previous approach to reading comprehension. More specifically, FIG. 1B depicts a specialized module 200 in which a pre-trained language model is augmented with specialized modules for each type of question 220. The specialized module 200 may comprise a neural architecture 230 comprising a reader 232 and a set of specialized operators 235. Example specialized operators 235 may include add/sub, count, span, answer type, or negation. The specialized module 200 is unique to each type of question, such that multiple specialized modules 200 would be required for different types of questions. The specialized module may receive a passage 210 and question 220, and produce an answer 250 based on the question type and related specialized operator required 235. The architecture shown in FIG. 1B suffers from an inability to scale to or among different domains.

FIG. 1C depicts another previous approach to reading comprehension. More specifically, FIG. 1C depicts a neural semantic parser model 300. The neural semantic parser model 300 may be applied to a structured parse 315 of a passage 310. The structured parser 315 may result in a structured table 325. The neural semantic parser 330 may receive the structured table 325 in order to generate a compositional program 340. The compositional program 340 may then be executed to produce an answer 350. The neural semantic parser model 300 of FIG. 1C may suffer from a cascade error.

Returning now to the present disclosure, a domain specific language (DSL) may be used to interpret the tokens generated by the programmer component 134 as an executable program 140. In some embodiments, span selection operators may be introduced so that all arithmetics, counting and sorting operators can be applied to the text passage 110. Introducing span selection operators in the DSL enables the application of discrete reasoning operators to text. Further, the resulting program may act as an executable and interpretable representation of the reasoning process.

NeRd can easily be applied to a different domain by extending the DSL with new operators. The DSL allows for complex programs to be generated by compositionally applying operators. Specifically, NeRd may compose different operators to synthesize complex programs for multi-step reasoning.

2.1 Neural Architecture

This section provides an overview of the two main components of NeRd, the reader and the programmer.

Example Reader. The reader (e.g., reader 132 of FIG. 1A) may receive a natural language text passage and a natural language question. The reader then may encoder each token $t_1$ in the natural language text passage into an embedding $e_1$. The proposed framework is agnostic to the architecture choice of the encoder, so any neural module that turns words into vectors is applicable. In some implementations, the reader may be a BERT model. In other embodiments, the reader may be any model operable to receive a natural language text question and passage and encode each token into an embedding.

Example Programmer. The programmer (e.g., programmer 134 of FIG. 1A) may take the output of the reader as an input, and then decode a program as a sequence of tokens. Similar to the reader, the programmer is agnostic to the design of decoder. In some implementations, the programmer may be a LSTM decoder with attention over the encoded text, and self-attention over the previously generated tokens. In other embodiments, the programmer may be any model operable to generate a program in a domain specific language. A unified programmer may be used to generate programs for multi-step reasoning. The operator set may be extended in the domain specific language to adapt to a different domain. This is advantageous over models that utilize separate specialized modules for each answer type, because it results in faster processing time and reduced memory storage.

2.2 Domain Specific Language

This section provides an overview of an example domain specific language (DSL), which may be to interpret the tokens generated by the programmer as an executable program.

To handle discrete reasoning, the DSL can include operators that perform arithmetics (e.g., DIFF, SUM), counting (e.g., COUNT) and sorting (e.g., ARGMAX, ARGMIN, MAX, MIN).

These operators have been used in previous work in semantic parsing over structured data sources such as a knowledge graph or a tabular database. The main challenge of applying such operations for reading comprehension is that the model needs to manipulate the natural language text (unstructured data) and parse the text into structured representations. This previous approach may introduce a lot of cascade errors. In some implementations of the present disclosure, span selection operators are introduced, so that all the arithmetics, counting and sorting operators can be applied to text. This approach enables the application of discrete reasoning operators to text, resulting in programs that act as executable and interpretable representations of a multi-step reasoning process.

In some implementations, the DSL may introduce PASSAGE_SPAN, QUESTION_SPAN, VALUE, KEY-VALUE for selecting spans or numbers from the passage and question. In some implementations, COUNT may use PASSAGE_SPAN to pick out the spans that mention the relevant entities or events, e.g., touchdowns made by a certain person, and then returns the total number. In another example embodiment, ARGMAX may rely on applying KEY-VALUE to pick out the spans (keys) for relevant mentions and their associated numbers (values), e.g., touchdowns and their lengths, and then returns the key with the highest value, e.g., the player kicking the longest touchdown. More examples can be found in Table 1 below. The introduction of span selection operators in the DSL enables the application of the discrete reasoning operators to text, and the resulting programs act as executable and interpretable representations of the reasoning process.

The architecture of the present disclosure is domain-agnostic and can easily be applied to a different domain by supplementing, modifying, extending, or replacing the DSL with new operators. For example, the MathQA benchmark could require adding more advanced mathematical operations beyond addition and subtraction.

An example advantage of the present invention's DSL design is its compositionality, e.g., complex programs may be generated by compositionally applying the operators. Previous works only allow applying the operators for one step, which requires them to introduce operators to mimic two-step compositions. However, this previous approach does not scale to more steps of reasoning, as the number of required operators will grow exponentially with the number of steps. In contrast, NeRd can compose different operators to synthesize complex programs for multi-step reasoning. For example, on MathQA, the average number of operations per question is 5, and some programs apply more than 30 operations to compute the final answer.

TABLE 1

Overview of example domain-specific language operators.

| Operator | Arguments | Outputs | Description |
| --- | --- | --- | --- |
| PASSAGE_SPAN | v0: the start index. | a span. | Select a span from the passage or question. |
| QUESTION_SPAN | v1: the end index. | | |
| VALUE | v0: an index. | a number. | Select a number from the passage. |
| KEY-VALUE (KV) | v0: a span. | a key-value pair. | Select a key (span) value (number) pair from the passage. |
| | v1: a number. | | |
| DIFF | v0: a number or index. | A number. | Compute the difference or sum of two numbers. |
| SUM | v1: a number or index. | | |
| COUNT | v: a set of spans. | a number. | Count the number of given spans. |
| MAX | v: a set of numbers. | a number. | Select the maximum/minimum among the given numbers. |
| MIN | | | |
| ARGMAX | v: a set of key-value pairs. | a span. | Select the key (span) with the highest/lowest value. |
| ARGMIN | | | |

3. Example Training

This section provides an overview of example techniques to train NeRd with weak supervision. While it is relatively easy to collect question-answer pairs, it is often hard and expensive to obtain program annotations that represent the reasoning behind the answers. In this section, example solutions to the cold start and spurious program problems for NeRd are presented.

3.1 Data Augmentation for Cold Start

The cold start problem associated with NeRd refers to the problem with getting training started when there is not an initial program available. For example, a question "How many touchdowns did Brady throw" annotated with only an answer "3" cannot be directly used to train the model due to the lack of the target program to optimize on. To first obtain program annotations from question-answer pairs, programs for questions answerable by span selection or arithmetic operations can be found via an exhaustive search. However, for questions involving counting or sorting operations, the space becomes too large for an exhaustive search since these operations rely on the span selection as their sub-routines. For example, the number of possible spans in a text with 200 words is in the order of $10^4$. Additionally, counting and sorting operators usually include more than one span as their arguments.

Aspects of the present disclosure apply data augmentation to address the search space explosion problem for counting and sorting operations. In some implementations, specifically for counting, the span selection questions are augmented by replacing the interrogatives, e.g., "what" and "who", with "how many" when applicable, and adding a call to COUNT over the selected spans in the answer. For example, a question "What areas have a Muslim population of more than 50000 people?" is changed into "How many areas . . . ".

In another example, specifically for sorting, the key-value pairs are extracted by first applying CoreNLP for entity recognition, and then heuristically finding an associated number for each entity. If including them as the arguments of any sorting operator yields the correct answer, then such programs are added to the training set.

Although the programs found for counting and sorting through the data augmentation process are noisy, this approach helps bootstrap the training to overcome the cold start problem. Throughout training, the model may also be used to decode programs, and the correct answers may be added into the training set so that the program can eventually self-supervise.

3.2 Hard EM with Thresholding Against Spurious Programs

Beyond the cold start problem, another obstacle to training NeRd is the spurious program problem, the phenomenon that a wrong program accidentally predicts a right answer. For example, per arithmetic question in DROP, there are on average 9.8 programs that return correct answers, but usually only one of them is semantically correct. To filter out spurious programs, some example implementations of the present model adopt hard EM due to its simplicity and efficiency.

Specifically, example implementations of the present approach use the current model to select the program with the highest model probability among the ones that return the correct answer, and then maximize the likelihood of the selected program. In other words, these implementations rely on the neural model itself to filter out spurious programs. This algorithm may be faster than the marginalized approach because at most one program per question-answer pair is used to compute the gradient, and the selection process is fast since it only has a forward pass. Hard EM assumes that for any question-answer pair, at least one of the generated programs is correct.

However, in some instances there are questions without any semantically correct program found, e.g., when the annotated answer itself is wrong. In this case, when directly applying the hard EM algorithm, even if the model probabilities for all the programs are very small, it will still select a program for training.

Reinforcement Learning-based approaches such as Memory Augmented Policy Optimization (MAPO) avoid this issue by optimizing the expected return, which weighs the gradient by the model probability. Thus, when all the programs of a question-answer pair have very small probabilities, they will be largely ignored during training. The present invention incorporates this intuition into hard EM by introducing a decaying threshold $\alpha$, so that a program's probability has to be at least $\alpha$ in order to be included for training. The pseudo-code of the example training procedure is presented in Algorithm 1 below.

---

Algorithm 1 Hard EM with Thresholding

Input: question-answer pairs $\{(x_i, y_i)\}_{i=1}^{N}$,
a model $p_\theta$, initial threshold $\alpha_0$, decay factor $\gamma$
for each $(x_i, y_i)$ do
    $Z_i \leftarrow$ DataAugmentation($x_i, y_i$)
$T \leftarrow 0$
repeat
    $\alpha \leftarrow \alpha_0 * \gamma^T$
    $\mathcal{D} \leftarrow \emptyset$
    for each $(x_i, y_i)$ do
        $z_i^* = \arg\max_k p_\theta(z_i^k|x_i), z_i^k \in Z_i$
        if $p_\theta(z_i^*) > \alpha$ or $T = 0$ and $|Z_i| = 1$ then
            $\mathcal{D} \leftarrow \mathcal{D} \cup (x_i, z_i^*)$
    Update $\theta$ by maximizing $\sum_\mathcal{D} \log p_\theta(z^*|x)$
    $T \leftarrow T + 1$
until converge or early stop

---

4. Example Experimental Evaluation

In this section, the effectiveness of example implementations of the present approach is examined on DROP and MathQA, two recent benchmarks that require discrete reasoning over passages, is presented.

4.1 DROP

DROP (Discrete Reasoning Over Paragraphs) [Dua et al. (2019)] is designed to combine the challenges from both reading comprehension and semantic parsing communities. Specifically, the passages are collected from Wikipedia, each having at least twenty numbers. The question-answer pairs are crowdsourced in an adversarial way that they are accepted only when the questions cannot be correctly answered by the BiDAF model. The dataset has 96.6K question-answer pairs from 6.7K passages. Unlike most existing datasets that are solely based on the single span selection, the questions in DROP require complex reasoning, such as selecting multiple spans, arithmetic operations over numbers in the passage, counting and sorting, etc., which poses extra challenges for existing models. For example, vanilla BERT only gets around 30% F1 score. Table 2 provides some sample questions in DROP.

TABLE 2

Examples of correct predictions on DROP development set.

| Passage | Question & Answer |
|---|---|
| Multiple spans | |
| ... the population was spread out with 26.20% under the age of 18, 9.30% from 18 to 24, 26.50% from 25 to 44, 23.50% from 45 to 64, and 14.60% who were 65 years of age or older ... | Question: Which groups in percent are larger than 16%? Program: PASSAGE_SPAN(26, 30), PASSAGE_SPAN(46, 48), PASSAGE_SPAN(55, 57) Result: 'under the age of 18', '25 to 44', '45 to 64' |
| When major general Nathanael Greene took command in the south, Marion and lieutenant colonel Henry Lee were ordered in January 1781 ... On August 31, Marion rescued a small American force trapped by 500 British soldiers ... | Question: When did Marion rescue the American force? Program: PASSAGE_SPAN(71, 71), PASSAGE_SPAN(72, 72), PASSAGE_SPAN(32, 32) Result: 'August', '31', '1781' |
| Numerical operations | |
| ... Lassen county had a population of 34,895. The racial makeup of Lassen county was 25,532 (73.2%) white (U.S. census), 2,834 (8.1%) African American (U.S. census) ... | Question: How many people were not either solely white or solely African American? Program: DIFF(9, SUM(10, 12)) Result: 34895 − (25532 + 2834) = 6529 |
| Counting | |
| ... the Bolshevik party came to power in November 1917 through the simultaneous election in the soviets and an organized uprising supported by military mutiny ... | Question: How many factors were involved in bringing the Bolsheviks to power? Program: COUNT(PASSAGE_SPAN(62, 66), PASSAGE_SPAN(69, 74)) Result: COUNT('simultaneous election in the soviets', 'organized uprising supported by military mutiny') = 2 |
| Sorting | |
| ... Jaguars kicker Josh Scobee managed to get a 48-yard field goal ... with kicker Nate Kaeding getting a 23-yard field goal ... | Question: Who kicked the longest field goal? Program: ARGMAX( KV(PASSAGE_SPAN(50, 53), VALUE(9)), KV(PASSAGE_SPAN(92, 94), VALUE(11))) Result: ARGMAX(KV('Josh Scobee', 48), KV('Nate Kaeding', 23)) = 'Josh Scobee' |
| ... Leftwich flipped a 1-yard touchdown pass to Wrighster ... Leftwich threw a 16-yard touchdown pass to Williams for a 38-0 lead ... | Question: How many yards was the shortest touchdown pass? Program: MIN(VALUE(17), VALUE(19)) Result: MIN(1, 16) = 1 |

For evaluation, the same metrics in [Dua et al. (2019)] were used: (1) Exact Match (EM), where the score is 1 if the prediction exactly matches the ground truth, and 0 otherwise; (2) F1 score, which gives partial credits to a prediction that is not exactly the same as the ground truth, but overlaps with it.

Similar to previous work for span prediction, an exhaustive search was performed to find all mentions of the ground truth spans in the passage, then include all of them as candidate programs. For numerical questions, another exhaustive search was performed over all expressions applying addition and subtraction over up to 3 numbers. In this way, the program is able to find at least one program for over 95% of the training samples with a number as the answer.

Example implementations of NeRd were evaluated against three types of baselines: (1) previous models on DROP; (2) NeRd with and without counting and sorting operations; (3) NeRd with different training algorithms, and we discuss the details below.

Previous approaches. Comparisons were made with NAQANet [Dua et al. (2019)], NABERT [Hu et al. (2019)], MTMSN [Hu et al. (2019)], and BERT-Calc [Andor et al. (2019)]. Key differences between NeRd and BERT-Calc, the baseline with the best performance, have been discussed elsewhere herein. On the other hand, NAQANet, NABERT, MTMSN share the same overall framework, where they augment an existing model to include individual modules for span selection, numerical expression generation, counting, negation, etc. While NAQANet is based on QANet, other baselines as well as NeRd are based on BERT. Note that the span selection modules themselves are not able to handle questions that return multiple spans as the answer, which causes the exact match accuracy to be zero on multiple-span selection questions for both NAQANet and NABERT. To tackle this issue, MTMSN adapts the non-maximum suppression algorithm to select multiple spans from the candidates with the top prediction probabilities.

Operator variants of NeRd. To show that NeRd learns to apply counting and sorting operations appropriately, the following two variants are also evaluated: (1) NeRd without counting: removing the COUNT operation in Table 1, and introducing 10 operations COUNT 0, COUNT_1, . . . , COUNT_9, where the execution engine returns the number x for operation COUNT_X. This counting process is the same as [Andor et al. (2019)]. (2) NeRd without sorting:

removing ARGMAX, ARGMIN, MAX and MIN operations, so that the model needs to use span selection operations for sorting questions.

Training variants of NeRd. To show the effectiveness of the proposed training algorithm, comparison was made with the following baselines: (1) Hard EM; and (2) Maximum Likelihood, which maximizes the likelihood of each program that returns the correct answer for a training sample.

Table 3 summarizes the main evaluation results on DROP dataset, with 9.5K samples in the development set and 9.6K hidden samples in the test set. Note that $NABERT_{LARGE}$ was not evaluated on the test set. Specifically, 10 NeRd models were trained with the best configuration from different random initialization, presenting the mean and standard error of the results on the development set, and submitting a single model to obtain the result on the hidden test set. On the test set, NeRd outperformed the previous models by 1.37% on exact match, and 1.18% on F1 score. Without additional training data and ensembling, NeRd still beat the previous single model, and the performance is on par with the previous ensemble model.

TABLE 3

Results on DROP dataset.

|  | Overall Dev | | Overall Test | | Number (62%) | | Span (32%) | | Spans (4.4%) | | Date (1.6%) | |
| --- | --- | --- | --- | --- | --- | --- | --- | --- | --- | --- | --- | --- |
|  | EM | F1 | EM | F1 | EM | F1 | EM | F1 | EM | F1 | EM | F1 |
| NAQANet | 46.75 | 50.39 | 44.24 | 47.77 | 44.9 | 45.0 | 58.2 | 64.8 | 0.0 | 27.3 | 32.0 | 39.6 |
| $NABERT_{LARGE}$ | 64.61 | 67.35 | — | — | 63.8 | 64.0 | 75.9 | 80.6 | 0.0 | 22.7 | 55.7 | 60.8 |
| $MTMSN_{LARGE}$ | 76.68 | 80.54 | 75.85 | 79.85 | 80.9 | 81.1 | 77.5 | 82.8 | 25.1 | 62.8 | 55.7 | 69.0 |
| BERT-Calc | 78.09 | 81.65 | 76.96 | 80.53 | 82.0 | 82.1 | 78.8 | 83.4 | 5.1 | 45.0 | 58.1 | 61.8 |
| * NeRd | 78.55 ± 0.27 | 81.85 ± 0.20 | 78.33 | 81.71 | 82.4 ± 0.3 | 82.6 ± 0.2 | 76.2 ± 0.4 | 81.8 ± 0.2 | 51.3 ± 0.8 | 77.6 ± 1.2 | 58.3 ± 1.8 | 67.2 ± 1.7 |

Examples of correct predictions are shown in Table 2. NeRd is able to compose multiple operations so as to obtain the correct answer, which helps boost the performance. In particular, for questions that require the selection of multiple spans, the exact match accuracy of NeRd is more than double of the best previous approach that is specially designed for multi-span prediction, and the F1 score also improves around 15%. Meanwhile, NeRd is able to generate more complicated arithmetic expressions than [Andor et al. (2019)], due to the compositionality of the proposed approach.

Tables 4a-b and 5a-b present the ablation studies of counting and sorting operations. Specifically, we evaluate on two subsets of DROP development set that include counting and sorting questions only, using the variants of NeRd with and without the corresponding operations. Adding these advanced operations can not only boost the performance, but also enable the model to provide the rationale behind its predictions. For counting problems, NeRd is able to select the spans related to the question. For sorting problems, NeRd first associates the entities with their corresponding values to compose the key-value pairs, then picks the most relevant ones for prediction. None of the previous models is able to demonstrate such reasoning processes, which suggests better interpretability of NeRd.

TABLE 4(a)

Results of counting question on DROP development set.

|  | with Count Op | w/o Count op |
| --- | --- | --- |
| EM | 73.1 | 71.2 |
| F1 | 73.1 | 71.2 |

TABLE 4(b)

Results of sorting on DROP development set.

|  | with Sort Ops | w/o Sort Ops |
| --- | --- | --- |
| EM | 83.9 | 82.1 |
| F1 | 86.8 | 85.5 |

TABLE 5(a)

| Passage | Question & Prediction |
| --- | --- |
| * . . . with field goals of 38 and 36 yards by kicker Dan Carpenter . . . followed by a 43-yard field goal by Carpenter . . . 52-yard field goal . . . | Question: How many total field goals were kicked in the game? Predicted Program: COUNT(PASSAGE_SPAN(75, 75), PASSAGE_SPAN(77, 78), PASSAGE_SPAN(133, 135), |

TABLE 5(a)-continued

| Passage | Question & Prediction |
|---|---|
| * . . . with the five most common surgeries being breast augmentation, liposuction, breast reduction, eyelid surgery and abdominoplasty . . . | PASSAGE_SPAN(315, 317)) <br> Result: COUNT('38', '36 yards', '43-yard', '52-yard') = 4 <br> Predicted Program (-counting): COUNT5 <br> Result: 5 <br> Question: How many of the five most common procedures are not done on the breasts? <br> Predicted Program: <br> COUNT(PASSAGE_SPAN(132, 135), <br> PASSAGE_SPAN(140, 142), <br> PASSAGE_SPAN(144, 149)) <br> Result: COUNT('liposuction', 'eyelid surgery', 'abdominoplasty') = 3 <br> Predicted Program (-counting): COUNT4 <br> Result: 4 |

TABLE 5(b)

| Passage | Question & Prediction |
|---|---|
| * . . . In the third quarter, Arizona's deficit continued to climb as Cassel completed a 76-yard touchdown pass to wide receiver Randy Moss . . . quarterback Matt Leinart completed a 78-yard touchdown pass to wide receiver Larry Fitzgerald . . . | Question: Who threw the longest touchdown pass? <br> Predicted Program: <br> ARGMAX(KV(PASSAGE_SPAN(205, 208), VALUE(18)), <br> KV(PASSAGE_SPAN(142, 143), VALUE(14))) <br> Result: ARGMAX(KV('Matt Leinart', 78), KV('Cassel', 76)) = 'Matt Leinart' <br> Predicted Program (-sorting): <br> PASSAGE_SPAN(82, 84) Result: Matt Cassel |
| * . . . Carney got a 38-yard field goal . . . with Carney connecting on a 39-yard field goal . . . | Question: How many yards was the longest field goal? <br> Predicted Program: <br> MAX(VALUE(14), VALUE(11)) <br> Result: MAX(39, 38) = 39 <br> Predicted Program (-sorting): VALUE(11) <br> Result: 38 |

Tables 5a-b: Examples of counting and sorting questions on DROP development set, where NeRd with the corresponding operations gives the correct predictions, while the variants without them do not. (a): counting; (b): sorting.

Finally, Table 6 presents the results of different training algorithms. First, it is observed that by filtering spurious programs, the hard EM significantly boosts the performance of the maximum likelihood training by 10%, which may be due to the fact that the exhaustive search finds plenty of spurious programs that yield the correct answer. Adding the threshold for program selection provides further improvement of about 7%, indicating that the proposed training algorithm can better handle the issue of spurious programs and be more tolerant to the noise of answer annotations.

TABLE 6

Results of different training algorithms on DROP development set.

|  | EM | F1 |
|---|---|---|
| Hard EM with thresholding | 2*80.58 | 2*83.42 |
| Hard EM | 73.72 | 77.46 |
| Maximum Likelihood | 63.96 | 67.98 |

4.2 MathQA

MathQA is a dataset with 37K question-answer pairs selected from AQuA, but it is further annotated with gold programs in their domain-specific language. The passage length in MathQA is 38 on average, much shorter than DROP with 224. However, the questions in MathQA require more complex and advanced mathematical reasoning than DROP. To this aim, they design 58 math operations, which cover various advanced math topics including geometry, physics, probability, etc. Accordingly, the DSL of the present disclosure is augmented with those operators to support more advanced numerical reasoning. In these annotated programs, the average number of operations per question is 5, and some programs involve more than 30 steps of computation. Table 7 shows an example from MathQA.

Each question in MathQA is accompanied with 4 options, where 1 of them is the correct answer. However, without having the full knowledge of the operation semantics, the present design chose a conservative metric to evaluate the accuracy. Specifically, a predicted program is considered to be correct only if it is exactly the same as the annotated program. Thus, this metric is an under-estimation of the accuracy based on the execution results. Despite this much stricter measurement for the evaluation of NeRd, testing showed that NeRd still outperformed the baselines by a large margin.

Besides the setting where all the ground truth programs are provided during training, the weak supervision setting on MathQA was also evaluated. Due to the lack of program executor, the search could not be performed in a manner similar to what was done on DROP. To enable the first training iteration of the model, the evaluation assumed that access was available to the ground truth programs for a small fraction of training samples at the beginning, and that only the final answer was known for the rest of training samples. In a first training iteration, the model only trains on the samples annotated with programs. In each of the following iterations, a beam search with a beam size 64 is first run to generate programs for each training sample that has not been annotated in previous iterations. Next, the generated program(s) are added only if the program is exactly the same as the ground truth annotation.

For a fair comparison, the reader model of the present disclosure uses the same pre-trained model as [Hu et al. (2019); Andor et al. (2019)], i.e., $\text{BERT}_{LARGE}$. For both benchmarks, greedy decoding was performed during the evaluation.

Comparison was made with Seq2prog and Seq2prog+cat models in [Amini et al. (2019)], which are LSTM-based encoder-decoder architectures implemented in OpenNMT [Klein et al. (2018)]. In particular, Seq2prog+cat extracts the category label of each question, then trains separate LSTMs to handle different categories, which improves the accuracy by 2.3%.

TABLE 7

Examples of correct predictions in MathQA dataset.

| Question | Answer |
|---|---|
| Someone on a skateboard is traveling 8 miles per hour. How many feet does she travel in 5 seconds? (1 mile = 5280 feet) | Program: multiply(5, divide(multiply(8, 5280), const 3600)) Result: 5 * ((8 * 5280)/3600) = 58.67 ft |

The results on MathQA test set with around 3K samples are presented in Table 8. NeRd dramatically boosts the accuracy of the baselines by 25.5%. In addition, a variant of NeRd was evaluated with the same model architecture, but the BERT encoder is not pre-trained and is randomly initialized. It was observed that this variant still yields a performance gain of 17.4%. Note that NeRd is measured by the program accuracy, which is a much stricter criterion and thus is an underestimation of the execution accuracy computed in [Amini et al. (2019)]. Moreover, even with only 20% training data labeled with ground truth programs, NeRd still outperforms the baseline.

TABLE 8

Results on MathQA test set, with NeRd and two variants: (1) no pre-training; (2) using 20% of the program annotations in training.

| | Accuracy |
|---|---|
| Seq2prog | 51.9 |
| Seq2prog + cat | 54.2 |
| NeRd | 79.7 |
| NeRd (-pretraining) | 71.6 |
| NeRd (20%) | 56.5 |

6. Additional Example Implementation Details 6.1 More Example Implementation Details about the Input Preprocessing Some examples preprocess the input passages and questions in a similar way as the input preprocessing of DROP dataset described in [Andor et al. (2019)]. Specifically, to facilitate the usage of BERT, some example implementations split up the documents longer than L=512 tokens. Meanwhile, some example implementations extract the locations and values of the numbers, so that they can be retrieved via indices when applying numerical operators. Some example implementations apply the same input preprocessing on MathQA as well.

6.2 More Discussion about Example Implementations of the Domain Specific Language To better support numerical reasoning, sometimes models can benefit from leveraging pre-defined constants for our computation. On MathQA, some example implementations have shown that applying the constant 3600, which is provided in their pre-defined question-agnostic constant list, is beneficial for the calculation in Table 7. Meanwhile, some example implementations show that defining such a constant list is also helpful on DROP benchmark. For example, a variant of the sample numerical operation question in Table 2 is "How many people, in terms of percentage, were not either solely white or solely African American?", and such questions are included in DROP dataset as well. In this case, unless the models are able to use the number 100 in their calculation, there is no way to obtain the correct answer. Again, previous works design specialized modules to deal with such questions, which is the main role of the negation module illustrated in FIG. 1. On the contrary, some example implementations leverage a constant list that is callable for every question, so that the model can learn to apply any constant covered in the list, without the need of manually designing separate modules for questions requiring different constants.

In the example evaluation for DROP, some example implementations used [100,12,28,29,30,31,1,0] as the constant list, which is helpful for percentage and date time calculation. For MathQA, some example implementations used the constant list provided in their public dataset, which includes 23 constants that cover common conversion between different units, domain-specific constants for geometry, physics and probability, etc.

6.3 More Details about an Example Model Architecture 6.3.1 Example Reader

One example reader implementation is largely the same as [Andor et al. (2019)]. Specifically, for the embedding representation of the reader component, some example implementations feed the question and passage jointly into BERT, which provides the output vector of each input token $t_i$ as $e_i$. Unless otherwise specified, the encoder is initialized with the uncased whole-word-masking version of $\text{BERT}_{LARGE}$. We denote the size of $e_i$ as $H_0$.

6.3.2 Example Programmer

In some implementations, the core architecture of the programmer is a 1-layer LSTM with the hidden size of H=512. To formally describe the input space and output space of the programmer, denote R as the size of the reserved tokens, which include both operators and constants in a domain-specific language, and the special start and end tokens [GO] and [EOF]; and L=512 as the total number of the question and passage tokens in a single sample. Samples with fewer than L=512 tokens will be padded with [EOF] tokens to achieve this length. In the following, we discuss the details of each component.

Example Input Embedding:

At each timestep, the programmer could generate a program token from: (1) the reserved tokens of the domain-specific language; and (2) the input question and passage tokens. The embedding of the i-th reserved token is $$hr_i = E_r^T r_i$$

Where $E_r$ is a trainable embedding matrix of size R×H, and $r_i$ is the one-hot encoding of the token.

For the i-th token in the input question and passage token list, their embedding is $$ht_i = P_t e_i$$

Where $P_t$ is a trainable projection matrix of size H×H$_0$.

Example Attention Module Over the Input:

At each timetstep T, let $[p_1, p_2, \ldots, p_{T-1}]$ denote the list of program tokens that are already generated in previous timesteps, and we define $[hp_0, hp_1, hp_2, \ldots, hp_{T-1}]$ as the decoder history, where $hp_0$ is the embedding vector of the |[GO]| token calculated as above; $[hp_1, hp_2, \ldots, hp_{T-1}]$ are H-dimensional vectors corresponding to the generated program token list.

Denote $(h_T, c_T) = \text{LSTM}(hp_{T-1}, (h_{T-1}, c_{T-1}))$ as the hidden state of the LSTM decoder at timestep T, where $(h_0, c_0)$ is the trainable initial state, and $hp_{T-1}$ is the LSTM input.

For each of $hp_i$ in the decoder history, compute $$vh_i = W_h hp_i$$

Where $W_h$ is a trainable matrix of size H×H.

The attention weight of each $hp_i$ in the decoder history is computed as $$wh_i = \frac{\exp(h_T^T vh_i)}{\sum_{j=0}^{T-1} \exp(h_T^T vh_j)}$$

The attention vector of the decoder history is thus $$att_h = \sum_{i=0}^{T-1} wh_i \cdot hp_i$$

Correspondingly, some example implementations compute the attention vector of the passage tokens $att_p$, and the attention vector of the question tokens $att_q$.

Afterwards, some example implementations compute $$v_T = W_v [att_h; att_q; att_p; h_T]$$

Where $W_v$ is a trainable matrix of size H×4H, and [a; b] denotes the concatenation of a and b.

Example Program Token Prediction:

Some example implementations compute another attention vector of the question tokens $att'_q$ in a similar way as above, but with a different set of trainable parameters. Then for each input token, we have $$ht'_i = P'[ht_i; ht_i \circ att'_q]$$

$$hr'_i = P'[hr_i; hr_i \circ att'_q]$$

Where P' is a trainable matrix of size H×2H, and ∘ is the Hadamard product.

Let $H'_T$ be a (R+L)×H-dimensional matrix, where the first R rows are $hr'_i$ for 0≤i<R, and the next L rows are $ht'_i$ for 0≤i<L. Then some example implementations compute $$w'_T = H'_T v_T$$

Where $w'_{T_i}$ denotes the weight of selecting the i-th token as the next program token.

Note that a valid program should satisfy the grammar constraints, for instance, those listed in the DROP dataset. Therefore, some example implementations compute a mask $m_T$ as an (R+L)-dimensional vector, where $m_{T_i}=1$ when the i-th token is a valid next program token, and $m_{T_i}=0$ if it is invalid. The following takes the DROP dataset as the example, and lists some sample rules for mask generation:

(1) At the beginning of the program generation, $m_{T_i}=1$ iff the i-th token denotes an operator;

(2) When the previous generated program token $p_{T-1}$ is |PASSAGE$_S$PAN|, then $m_{T_i}=1$ iff the i-th token is from the passage. Similarly, if $p_{T-1}$ is |QUESTION$_S$PAN|, then $m_{T_i}=1$ iff the i-th token is from the question.

(3) Some example implementations preprocess the data to extract the locations and values of numbers in the input question and passage, thus the computing system can leverage it to generate masks for numerical calculation operators. Specifically, when $p_{T-1} \in \{|\text{DIFF}|, |\text{SUM}|, |\text{VALUE}|\}$, $m_{T_i}=1$ iff the i-th token is from the constant list, or a number from either the input question or the passage.

With the generated program mask, some example implementations compute $$w_T = w'_T - C(1 - m_T)$$

Where C is a large positive constant to ensure that the weight of an invalid program token is much smaller than the valid program tokens. In practice, some example implementations use C=1e6. Such a grammar-based decoding process ensures the syntactic correctness of the generated programs.

Afterwards, the model predicts $p_T = \text{argmax}_i(w_T)$ as the next program token. Some example implementations can also apply the beam search for decoding, but the greedy decoding is typically sufficient to provide good results, while the inference process is also much faster than the beam search.

Finally, $hp_T = H'^T_{p_T}$ is the vector representation corresponding to $p_T$, which can be appended to the decoder history for generating the next program token.

6.4 More Details about Example Training Implementations 6.4.1 Example Data Augmentation This section discusses the details of an example data augmentation process for counting and sorting questions on DROP. To obtain training samples for counting questions with ground truth annotations, starting from the span selection questions in the training set, some example implementations filter out those questions that either can be answered by using the QUESTION_SPAN operation, or do not start with any interrogative in ["What", "Which", "Who", "Where"]. Afterwards, some example implementations replace the interrogative with "How many", and modify the ground truth program correspondingly. In this way, we can augment 15K additional questions for counting in DROP training set.

To annotate the key-value pairs, for each entity recognized by the CoreNLP tool, some example implementations search for the numbers that are in the same clause as the entity, i.e., not separated by any punctuation mark, and discard those entities that do not have any nearby number satisfying this constraint. Afterwards, some example implementations filter out those questions that do not include any superlative in ["longest", "shortest", "largest", "smallest", "most" and "least"]. For the remaining questions, some example implementations call each of the sorting operations, i.e., ARGMAX, ARGMIN, MAX, MIN, with all extracted key-value pairs as the arguments. For ARGMAX and MAX operators, the key-value pairs are sorted in the descending order of their values; for ARGMIN and MIN operators, they are sorted in the increasing order of their values. If any of the resulting sorting program(s) yields the correct answer, the program is included into the training set. In this way, 0.9K questions can be annotated using ARGMAX or ARGMIN operations, and 1.8K questions using MAX or MIN operations in DROP training set.

6.4.2 Example Training Configurations

Example settings for the training algorithm described in Algorithm 1 are that the initial threshold $\alpha_0=0.5$, and the decay factor $\gamma=0.5$. Some example implementations can perform early stopping when both exact match and F1 score on the development set do not improve for two consecutive training iterations. For both DROP and MathQA datasets, the training typically takes around 50K~60K training steps.

For both tasks in the evaluations, some example implementations train the model with Adam optimizer, with an initial learning rate of 5e-5, and batch size of 32. Gradients with $L_2$ norm larger than 1.0 are clipped.

7. Example Methods

Figure 2:
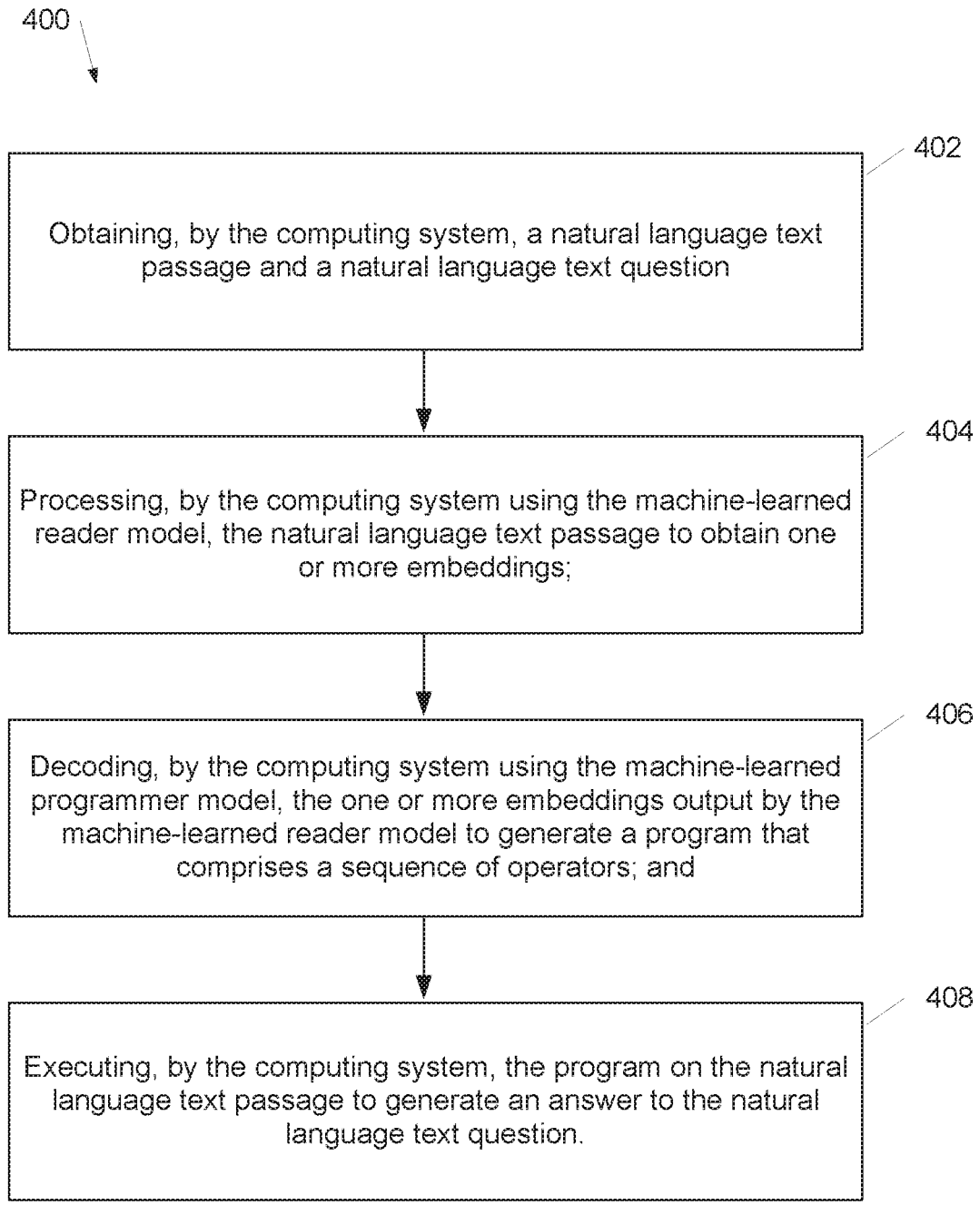
FIG. 2 depicts a flow chart displaying an example method of natural language processing with machine learning according to example implementations of the present disclosure.

FIG. 2 depicts a flow chart diagram of an example method to perform reading comprehension according to example embodiments of the present disclosure. Specifically, FIG. 2 depicts a flow chart diagram of an example method 400 to perform operations for reading comprehension. Although FIG. 2 depicts steps performed in a particular order for purposes of illustration and discussion, the methods of the present disclosure are not limited to the particularly illustrated order or arrangement. The various steps of the method 400 can be omitted, rearranged, combined, and/or adapted in various ways without deviating from the scope of the present disclosure.

At 402, a computing system obtains a natural language text passage and a natural language text question.

At 404, the computing system processes the natural language text passage to obtain one or more embeddings.

At 406, the computing system decodes the one or more embeddings output by the machine-learned reader model to generate a program that comprises a sequence of operators.

In some implementations, decoding, by the computing system using the machine-learned programmer model, the one or more embeddings output by the machine-learned reader model further comprises: obtaining, by the computing system, a domain specific language; and identifying, by the computing system, an associated set of operators for the domain specific language.

In some implementations, decoding, by the computing system using the machine-learned programmer model, the one or more embeddings output by the machine-learned reader model comprises greedily selecting the sequence of operators.

At 408, the computing system executes the program on the natural language text passage to generate an answer to the natural language text question.

In some implementations, the method further includes modifying, by the computing system using the machine-learned programmer model, the embeddings output by the machine-learned reader model to generate the program that comprises the sequence of operators matching the domain specific language. In some implementations, executing, by the computing system, the program comprises executing, by the computing system, the program on the natural language text passage to generate the answer to the natural language text question in the domain specific language.

In some implementations, the associated set of operators for the domain specific language comprises a set of span selection operators.

In some implementations, the associated set of operators for the domain specific language comprises a set of constants.

In some implementations, the natural language question comprises a mathematical question and the answer comprises a numeric value.

In some implementations, the program comprises one or more of the sequence of operators performed multiple times in sequence to generate the answer to the natural language text question.

In some implementations, the method further includes: preprocessing, by the computing system using the machine-learned reader model, the natural language text passage to extract a location and a value of one or more numbers in the natural text passage; and generating, by the computing system using a machine-learned reader model, one or more masks for one or more corresponding numerical calculation operators of the sequence of operators.

Figure 3:
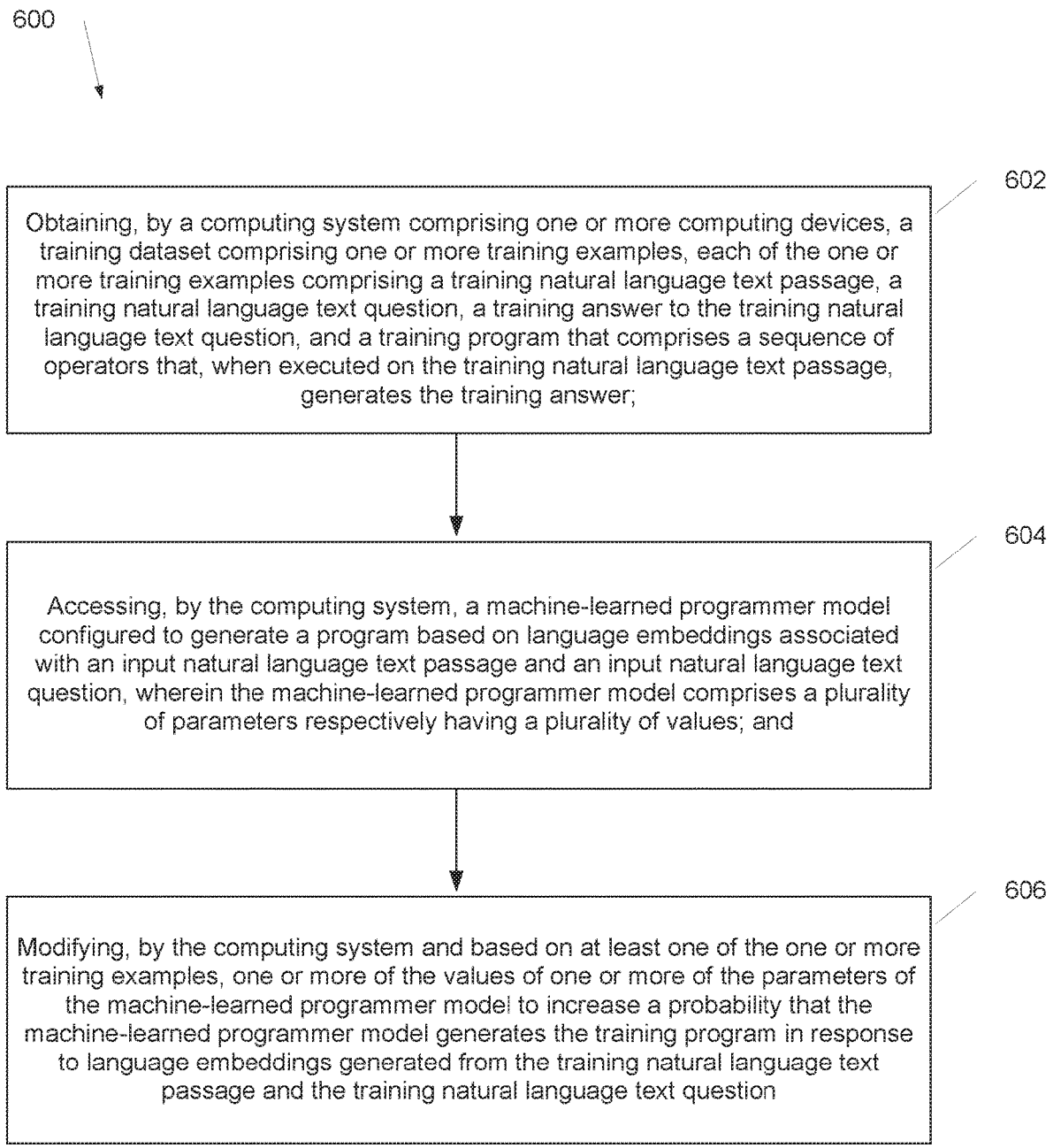
FIG. 3 depicts a flow chart diagram of an example method to train machine learning models to perform reading comprehension according to example embodiments of the present disclosure.

FIG. 3 depicts a flow chart diagram of an example method 600 to train machine learning models to perform reading comprehension according to example embodiments of the present disclosure. Although FIG. 3 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, the computing system obtains a training dataset. The training dataset may comprise one or more training examples. Each of the one or more training examples may comprise a training natural language text passage, a training natural language text question, a training answer to the training natural language text question, and a training program. Further, the training program may comprise a sequence of operators that, when executed on the training natural language text passage, generates the training answer;

In some implementations, obtaining, by the computing system, the training dataset comprises performing an exhaustive search to generate one or more of the training programs.

In some implementations, obtaining, by the computing system, the training dataset comprises applying data augmentation techniques for a counting or a sorting operation in the training natural language text question. In some implementations, applying data augmentation techniques comprises replacing an interrogative with a count operation. In some implementations, applying data augmentation techniques comprises: extracting, by the computing system, a series of key-value pairs to identify an entity; and identifying, by the computing system, an associated number for each entity.

At 604, the computing system accesses a machine-learned programmer model configured to generate a program based on language embeddings associated with an input natural language text passage and an input natural language text question. The machine-learned programmer model comprises a plurality of parameters respectively having a plurality of values.

At 606, the computing system modifies one or more of the values of one or more the parameters of the machine-learned programmer model to increase a probability that the machine-learned programmer model generates the training program in response to language embeddings generated from the training natural language text passage and the training natural language text question.

In some implementations, the method 600 further includes identifying, by the computing system, a series of training programs; applying, by the computing system, a decaying threshold such that a probability of each training program must be at least the decaying threshold; applying, by the computing system, a hard EM algorithm; and selecting, by the computing system, a training program with a highest model probability among a series of training programs that return the correct answer.

In some embodiments, ground truth programs may be used. In this example, questions that can be answered by using the QUESTION_SPAN operation or do not start with an interrogative may be filtered out. Following this step, the interrogative may be replaced and the ground truth program modified correspondingly. This may result in augmenting 15,000 additional questions for counting in the training set.

In some embodiments, to annotate the key-value pairs, for each entity recognized by the CoreNLP tool, the model may search for numbers that are in the same clause as the entity, e.g., not separated by any punctuation mark. Further, the model may discard any entity that doesn't have a nearby number satisfying the constraint. Questions that do not include a superlative also may be filtered out. The resulting extracted key-value pairs may be sorted in descending order of their values for ARGMAX and MAX operators, or in increasing order of their values for ARGMIN and MIN operators. Any programs yielding the correct answer may also be included in the training set.

For the training algorithm provided in Algorithm 1, example embodiments of the present disclosure may perform early stopping when both the initial threshold and the decay factor match and the F1 score on the development set do not improve for two consecutive training iterations. In some embodiments, the model may be trained with an Adam optimizer.

8. Example Computing Systems

Figure 4A:
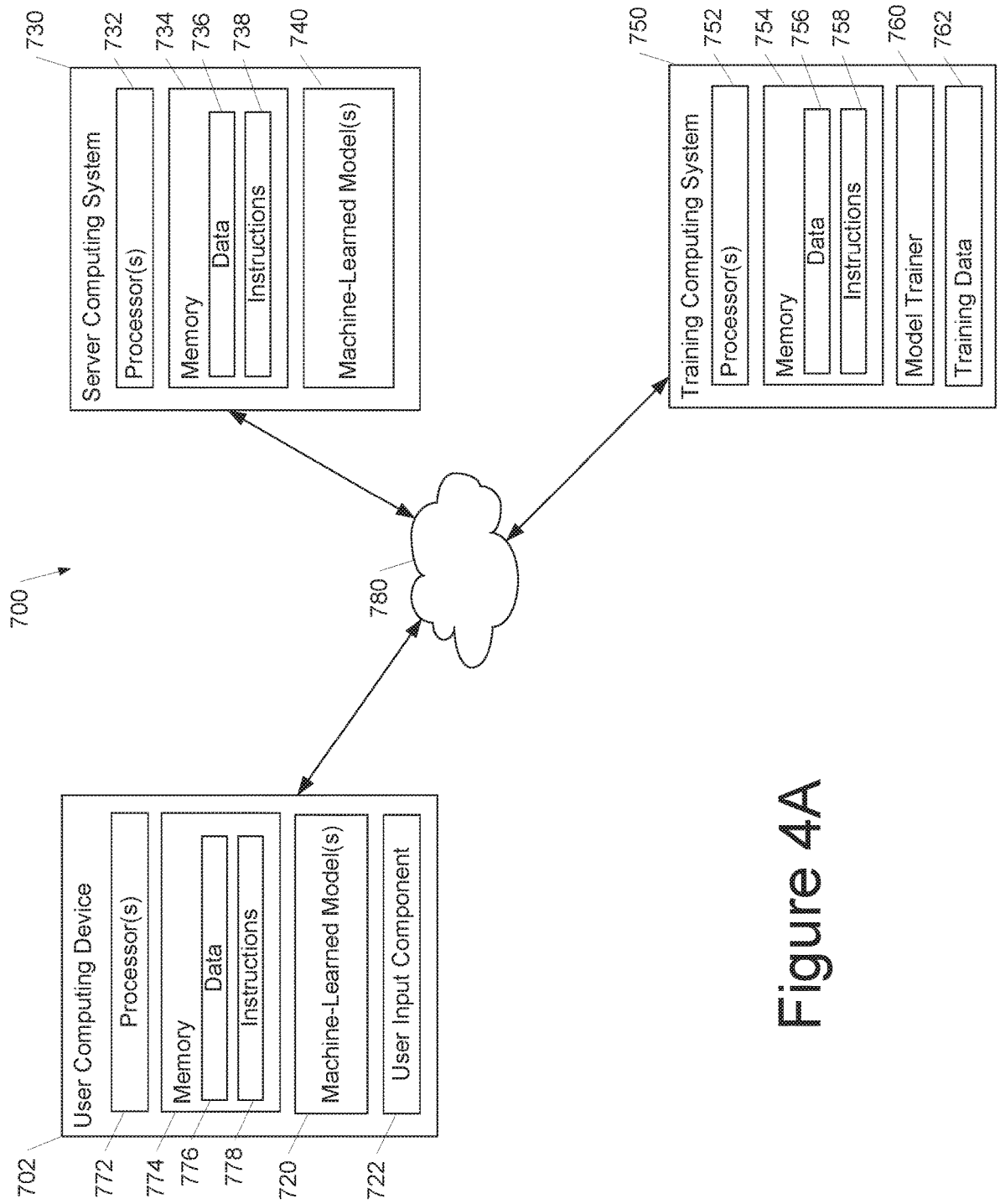
FIG. 4A depicts a block diagram of an example computing system according to example embodiments of the present disclosure.

FIG. 4A depicts a block diagram of an example computing system 700 according to example embodiments of the present disclosure. The system 700 includes a user computing device 702, a server computing system 730, and a training computing system 750 that are communicatively coupled over a network 780.

The user computing device 702 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 702 includes one or more processors 772 and a memory 774. The one or more processors 772 can be any suitable processing device (e.g., a processor core, a microprocessor, an ASIC, a FPGA, a controller, a microcontroller, etc.) and can be one processor or a plurality of processors that are operatively connected. The memory 774 can include one or more non-transitory computer-readable storage mediums, such as RAM, ROM, EEPROM, EPROM, flash memory devices, magnetic disks, etc., and combinations thereof. The memory 774 can store data 776 and instructions 778 which are executed by the processor 772 to cause the user computing device 702 to perform operations.

In some implementations, the user computing device 702 can store or include one or more machine-learned models 720. For example, the machine-learned models 720 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example machine-learned models 720 are discussed with reference to FIG. 1A.

In some implementations, the one or more machine-learned models 720 can be received from the server computing system 730 over network 780, stored in the user computing device memory 774, and then used or otherwise implemented by the one or more processors 772. In some implementations, the user computing device 702 can implement multiple parallel instances of a single machine-learned model 720 (e.g., to perform parallel program composition across multiple instances of passages/questions).

Additionally or alternatively, one or more machine-learned models 740 can be included in or otherwise stored and implemented by the server computing system 730 that communicates with the user computing device 702 according to a client-server relationship. For example, the machine-learned models 740 can be implemented by the server computing system 740 as a portion of a web service (e.g., a program composition service). Thus, one or more models 720 can be stored and implemented at the user computing device 702 and/or one or more models 740 can be stored and implemented at the server computing system 730.

The user computing device 702 can also include one or more user input component 722 that receives user input. For example, the user input component 722 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 730 includes one or more processors 732 and a memory 734. The one or more processors 732 can be any suitable processing device (e.g., a processor core, a microprocessor, an ASIC, a FPGA, a controller, a microcontroller, etc.) and can be one processor or a plurality of processors that are operatively connected. The memory 734 can include one or more non-transitory computer-readable storage mediums, such as RAM, ROM, EEPROM, EPROM, flash memory devices, magnetic disks, etc., and combinations thereof. The memory 734 can store data 736 and instructions 738 which are executed by the processor 732 to cause the server computing system 730 to perform operations.

In some implementations, the server computing system 730 includes or is otherwise implemented by one or more server computing devices. In instances in which the server computing system 730 includes plural server computing devices, such server computing devices can operate according to sequential computing architectures, parallel computing architectures, or some combination thereof.

As described above, the server computing system 730 can store or otherwise include one or more machine-learned models 740. For example, the models 740 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 740 are discussed with reference to FIG. 1A.

The user computing device 702 and/or the server computing system 730 can train the models 720 and/or 740 via interaction with the training computing system 750 that is communicatively coupled over the network 780. The training computing system 750 can be separate from the server computing system 730 or can be a portion of the server computing system 730.

The training computing system 750 includes one or more processors 752 and a memory 754. The one or more processors 752 can be any suitable processing device (e.g., a processor core, a microprocessor, an ASIC, a FPGA, a controller, a microcontroller, etc.) and can be one processor or a plurality of processors that are operatively connected. The memory 754 can include one or more non-transitory computer-readable storage mediums, such as RAM, ROM, EEPROM, EPROM, flash memory devices, magnetic disks, etc., and combinations thereof. The memory 754 can store data 756 and instructions 758 which are executed by the processor 752 to cause the training computing system 750 to perform operations. In some implementations, the training computing system 750 includes or is otherwise implemented by one or more server computing devices.

The training computing system 750 can include a model trainer 760 that trains the machine-learned models 720 and/or 740 stored at the user computing device 702 and/or the server computing system 730 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 760 can perform a number of generalization techniques (e.g., weight decays, dropouts, etc.) to improve the generalization capability of the models being trained.

In particular, the model trainer 760 can train the machine-learned models 720 and/or 740 based on a set of training data 762. The training data 762 can include, for example, a training natural language text passage, a training natural language text question, a training answer to the training natural language text question, and a training program that comprises a sequence of operators that, when executed on the training natural language text passage, generates the training answer.

In some implementations, if the user has provided consent, the training examples can be provided by the user computing device 702. Thus, in such implementations, the model 720 provided to the user computing device 702 can be trained by the training computing system 750 on user-specific data received from the user computing device 702. In some instances, this process can be referred to as personalizing the model.

The model trainer 760 includes computer logic utilized to provide desired functionality. The model trainer 760 can be implemented in hardware, firmware, and/or software controlling a general purpose processor. For example, in some implementations, the model trainer 760 includes program files stored on a storage device, loaded into a memory and executed by one or more processors. In other implementations, the model trainer 760 includes one or more sets of computer-executable instructions that are stored in a tangible computer-readable storage medium such as RAM hard disk or optical or magnetic media.

The network 780 can be any type of communications network, such as a local area network (e.g., intranet), wide area network (e.g., Internet), or some combination thereof and can include any number of wired or wireless links. In general, communication over the network 780 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 4A illustrates one example computing system that can be used to implement the present disclosure. Other computing systems can be used as well. For example, in some implementations, the user computing device 702 can include the model trainer 760 and the training dataset 762. In such implementations, the models 720 can be both trained and used locally at the user computing device 702. In some of such implementations, the user computing device 702 can implement the model trainer 760 to personalize the models 720 based on user-specific data.

Figure 4B:
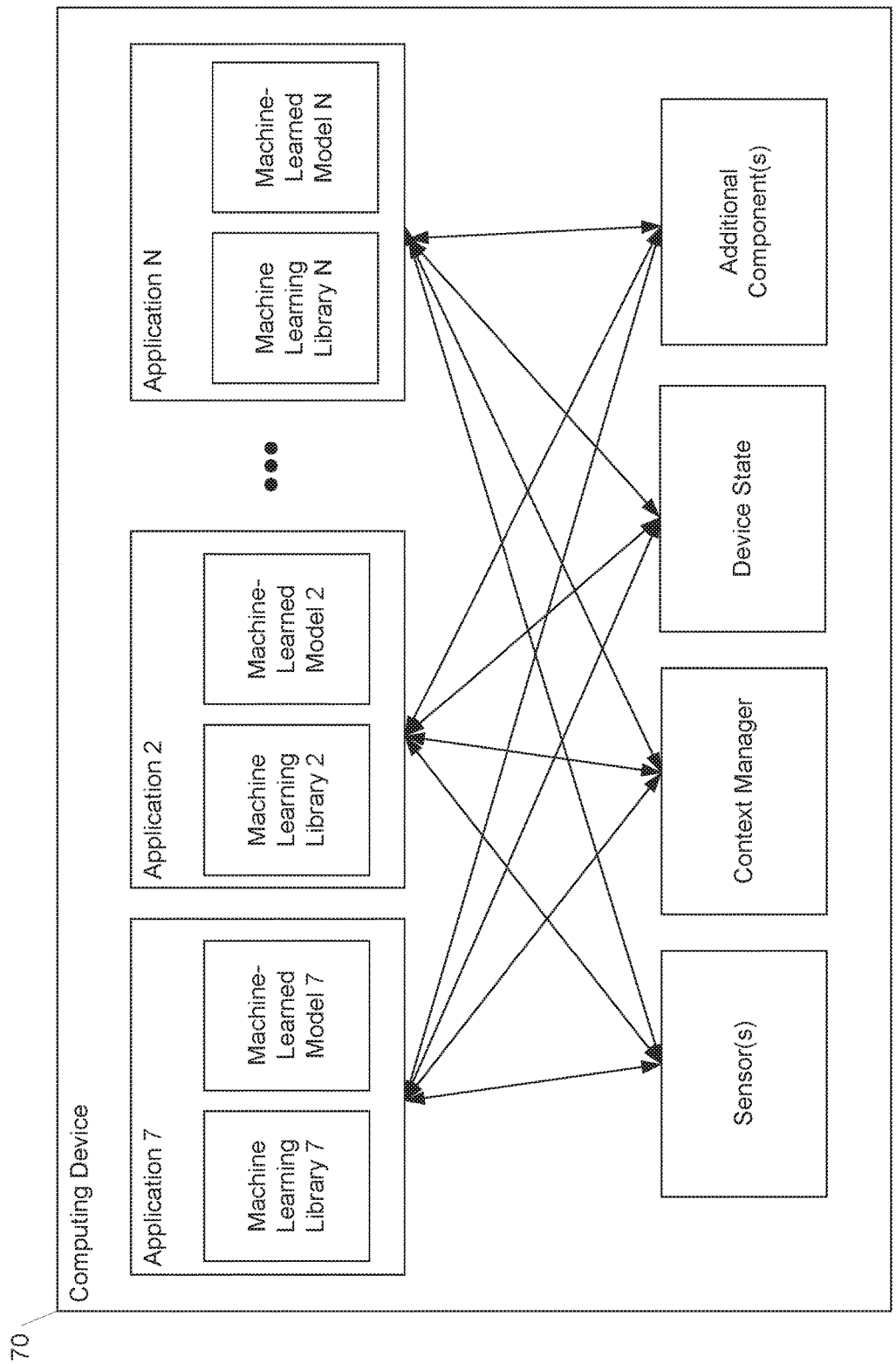
FIG. 4B depicts a block diagram of an example computing device according to example embodiments of the present disclosure.

FIG. 4B depicts a block diagram of an example computing device 70 that performs according to example embodiments of the present disclosure. The computing device 70 can be a user computing device or a server computing device.

The computing device 70 includes a number of applications (e.g., applications 7 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 4B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 4C:
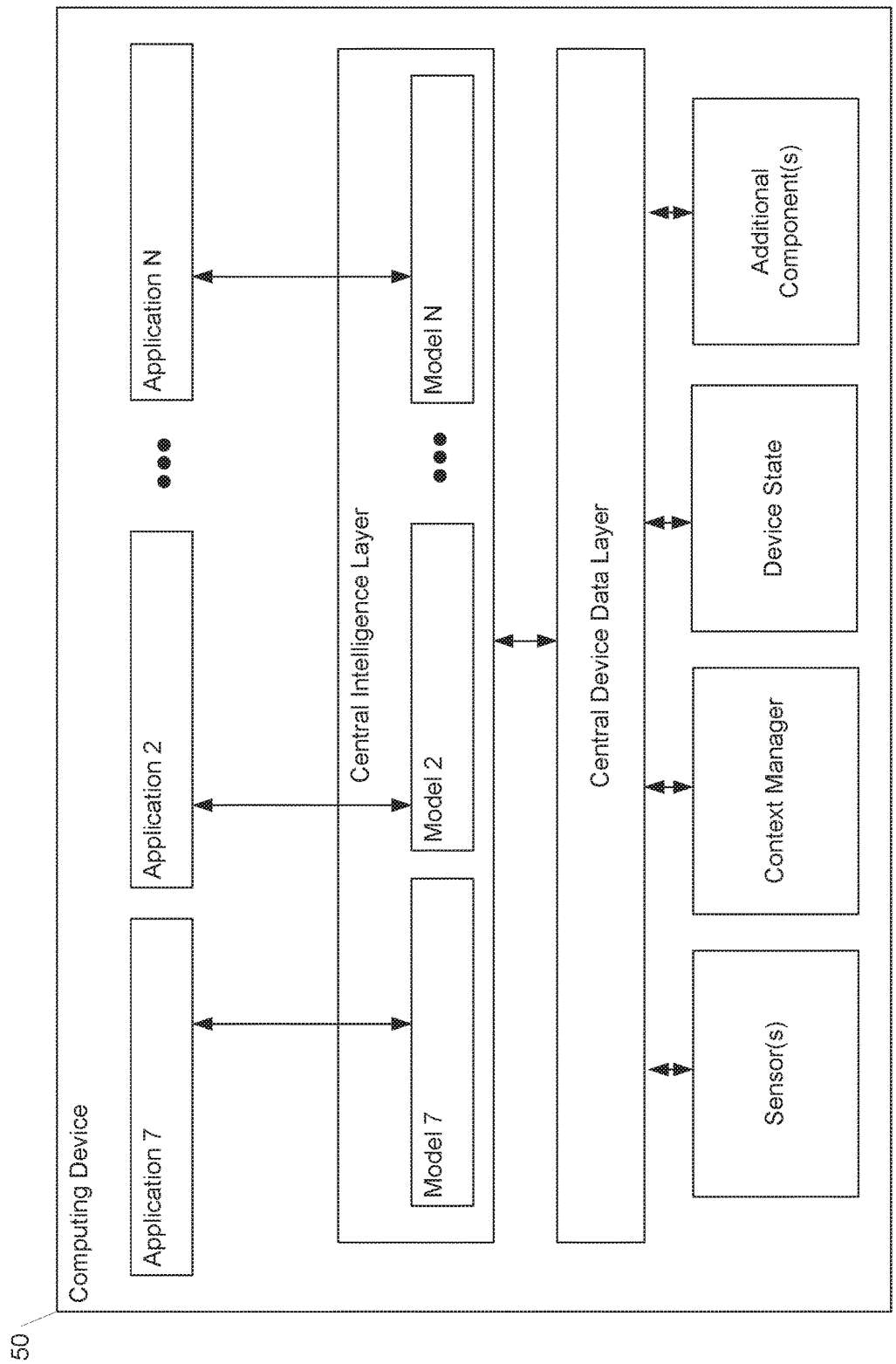
FIG. 4C depicts a block diagram of an example computing device according to example embodiments of the present disclosure.

FIG. 4C depicts a block diagram of an example computing device 50 that performs according to example embodiments of the present disclosure. The computing device 50 can be a user computing device or a server computing device.

The computing device 50 includes a number of applications (e.g., applications 7 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 4C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 4C, the central device data layer can communicate with a number of other components of the computing device, such as, for example, one or more sensors, a context manager, a device state component, and/or additional components. In some implementations, the central device data layer can communicate with each device component using an API (e.g., a private API).

9. Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method to train machine learning models to perform reading comprehension, the method comprising:
    obtaining, by a computing system comprising one or more computing devices, a training dataset comprising one or more training examples, each of the one or more training examples comprising:
        a training natural language text passage,
        a training natural language text question,
        a training answer to the training natural language text question, and
        a training program that comprises a sequence of operators that, when executed on the training natural language text passage by inputting the training natural language text passage to the training program, generates the training answer;
    wherein obtaining the training dataset comprises:
        identifying, by the computing system, a set of training programs that return the training answer;
        selecting, by the computing system, the training program having a model probability that is a highest model probability among the set of training programs; and
        applying, by the computing system, a decaying threshold such that the model probability of the training program must be at least the decaying threshold;
    accessing, by the computing system, a machine-learned programmer model configured to generate a program based on language embeddings associated with an input natural language text passage and an input natural language text question, wherein the machine-learned programmer model comprises a plurality of parameters respectively having a plurality of values; and
    modifying, by the computing system and based on at least one of the one or more training examples, one or more of the values of one or more of the parameters of the machine-learned programmer model to increase a probability that the machine-learned programmer model generates the training program in response to language embeddings generated from the training natural language text passage and the training natural language text question.

2. The computer-implemented method of claim 1, wherein obtaining, by the computing system, the training dataset comprises performing an exhaustive search to generate one or more of the training programs.

3. The computer-implemented method of claim 1, wherein obtaining, by the computing system, the training dataset comprises applying data augmentation techniques to the training natural language text question.

4. The computer-implemented method of claim 3, wherein applying data augmentation techniques comprises:
    extracting, by the computing system, a series of key-value pairs to identify an entity; and
    identifying, by the computing system, an associated number for each entity.

5. The computer-implemented method of claim 1, further comprising:
    generating, by the computing system, the set of training programs using the machine-learned programmer model based on the training natural language text passage and the training natural language text question.

6. The computer-implemented method of claim 1, wherein the machine-learned programmer model is configured to identify a set of operators associated with a domain specific language and assemble a sequence of operators selected from the set of operators.

7. The computer-implemented method of claim 6, wherein the set of operators comprises a span selection operator.

8. A computing system, comprising:
    one or more processors;
    one or more non-transitory computer readable media storing instructions executable to cause the computing system to perform operations, the operations comprising:
        obtaining a training dataset comprising one or more training examples, each of the one or more training examples comprising:
            a training natural language text passage,
            a training natural language text question,
            a training answer to the training natural language text question, and
            a training program that comprises a sequence of operators that, when executed on the training natural language text passage by inputting the training natural language text passage to the training program, generates the training answer;

wherein obtaining the training dataset comprises:
- identifying, by the computing system, a set of training programs that return the training answer;
- selecting, by the computing system, the training program having a model probability that is a highest model probability among the set of training programs; and
- applying, by the computing system, a decaying threshold such that the model probability of the training program must be at least the decaying threshold;

accessing a machine-learned programmer model configured to generate a program based on language embeddings associated with an input natural language text passage and an input natural language text question, wherein the machine-learned programmer model comprises a plurality of parameters respectively having a plurality of values; and modifying, based on at least one of the one or more training examples, one or more of the values of one or more of the parameters of the machine-learned programmer model to increase a probability that the machine-learned programmer model generates the training program in response to language embeddings generated from the training natural language text passage and the training natural language text question.

9. The computing system of claim 8, wherein obtaining the training dataset comprises performing an exhaustive search to generate one or more of the training programs.

10. The computing system of claim 8, wherein obtaining the training dataset comprises applying data augmentation techniques to the training natural language text question.

11. The computing system of claim 10, wherein applying data augmentation techniques comprises:
- extracting a series of key-value pairs to identify an entity; and
- identifying an associated number for each entity.

12. The computing system of claim 8, the operations further comprising:
- generating the set of training programs using the machine-learned programmer model based on the training natural language text passage and the training natural language text question.

13. The computing system of claim 8, wherein the machine-learned programmer model is configured to identify a set of operators associated with a domain specific language and assemble a sequence of operators selected from the set of operators.

14. The computing system of claim 13, wherein the set of operators comprises a span selection operator.

15. One or more non-transitory computer readable media storing instructions executable to cause a computing system to perform operations, the operations comprising:
- obtaining a training dataset comprising one or more training examples, each of the one or more training examples comprising:
  - a training natural language text passage,
  - a training natural language text question,
  - a training answer to the training natural language text question, and
  - a training program that comprises a sequence of operators that, when executed on the training natural language text passage by inputting the training natural language text passage to the training program, generates the training answer;
  - wherein obtaining the training dataset comprises:
    - identifying, by the computing system, a set of training programs that return the training answer;
    - selecting, by the computing system, the training program having a model probability that is a highest model probability among the set of training programs; and
    - applying, by the computing system, a decaying threshold such that the model probability of the training program must be at least the decaying threshold;
- accessing a machine-learned programmer model configured to generate a program based on language embeddings associated with an input natural language text passage and an input natural language text question, wherein the machine-learned programmer model comprises a plurality of parameters respectively having a plurality of values; and
- modifying, based on at least one of the one or more training examples, one or more of the values of one or more of the parameters of the machine-learned programmer model to increase a probability that the machine-learned programmer model generates the training program in response to language embeddings generated from the training natural language text passage and the training natural language text question.

16. The one or more non-transitory computer readable media of claim 15, wherein obtaining the training data set comprises performing an exhaustive search to generate one or more of the training programs.

17. The one or more non-transitory computer readable media of claim 15, wherein obtaining the training dataset comprises applying data augmentation techniques to the training natural language text question.

18. The one or more non-transitory computer readable media of claim 15, the operations further comprising:
- generating the set of training programs using the machine-learned programmer model based on the training natural language text passage and the training natural language text question.

19. The one or more non-transitory computer readable media of claim 15, wherein the machine-learned programmer model is configured to identify a set of operators associated with a domain specific language and assemble a sequence of operators selected from the set of operators.

20. The one or more non-transitory computer readable media of claim 19, wherein the set of operators comprises a span selection operator.

* * * * *